US009325390B2

(12) United States Patent
Ding et al.

(10) Patent No.: US 9,325,390 B2
(45) Date of Patent: Apr. 26, 2016

(54) WIRELESS COMMUNICATIONS SYSTEM AND PRECODING METHOD

(75) Inventors: Ming Ding, Shanghai (CN); Renmao Liu, Shanghai (CN); Yingyu Zhang, Shanghai (CN); Lei Huang, Shanghai (CN); Chen Chen, Shanghai (CN); Guolin Sun, Shanghai (CN)

(73) Assignee: SHARP KABUSHIKI KAISHA, Osaka (JP)

(*) Notice: Subject to any disclaimer, the term of this patent is extended or adjusted under 35 U.S.C. 154(b) by 405 days.

(21) Appl. No.: 13/126,677

(22) PCT Filed: Nov. 4, 2009

(86) PCT No.: PCT/JP2009/069146
§ 371 (c)(1),
(2), (4) Date: Apr. 28, 2011

(87) PCT Pub. No.: WO2010/061724
PCT Pub. Date: Jun. 3, 2010

(65) Prior Publication Data
US 2011/0206154 A1  Aug. 25, 2011

(30) Foreign Application Priority Data
Nov. 3, 2008  (CN) .......................... 2008 1 0172704

(51) Int. Cl.
*H04B 7/06* (2006.01)
*H04B 7/02* (2006.01)
(Continued)

(52) U.S. Cl.
CPC .............. *H04B 7/024* (2013.01); *H04B 7/0486* (2013.01); *H04B 7/0632* (2013.01);
(Continued)

(58) Field of Classification Search
CPC .. H04B 7/0417; H04B 7/0634; H04B 7/0639; H04B 1/109; H04B 7/0619; H04B 7/0689; H04B 7/0413; H04B 7/086
See application file for complete search history.

(56) References Cited

U.S. PATENT DOCUMENTS 8,755,451 B2   6/2014  Jung et al.
2006/0209883 A1*  9/2006  Suzuki .................. H04B 7/022
370/465

(Continued)

FOREIGN PATENT DOCUMENTS

WO   WO 2008/030035 A2   3/2008
WO   WO 2009/084903 A2   7/2009

OTHER PUBLICATIONS

R1-082575 ("Proposals for LTE-Advanced Technologies", 3GPP TSG RAN WG1, Jun. 30-Jul. 4, 2008).*

(Continued)

*Primary Examiner* — Andrew Chriss
*Assistant Examiner* — Salvador E Rivas
(74) *Attorney, Agent, or Firm* — Birch, Stewart, Kolasch & Birch, LLP

(57) ABSTRACT

The present invention provides a precoding method for use in a wireless communications system. According to the precoding method of the present invention, a serving base station and cooperative communication base stations employ an identical precoding matrix so as to weight transmission signals and then transmit them. The weighting stands for multiplication of results of overall precoding or each layer precoding process by weight values at the serving base station and the cooperative communication base stations. A user device corresponding to the serving base station and the cooperative communication base stations receives a signal which is obtained by an operation in which the serving base station and the cooperative communication base stations perform an identical precoding process and additively combine results of overall precoding or each layer precoding process with one another. The user device feeds back information which includes (i) precoding matrix information for the serving base station and the cooperative communication base stations, (ii) weight vector information for either overall precoding or layer precoding, and (iii) a quantized value of channel quality. This feedback information is thus advantageous in that its signaling information amount is small.

13 Claims, 6 Drawing Sheets

(51) Int. Cl.
*H04B 7/08* (2006.01)
*H04L 1/06* (2006.01)
*H04L 25/03* (2006.01)
*H04B 7/04* (2006.01)
*H04L 1/00* (2006.01)
*H04L 5/00* (2006.01)

(52) U.S. Cl.
CPC .......... *H04B 7/0634* (2013.01); *H04B 7/0639* (2013.01); *H04B 7/086* (2013.01); *H04L 1/0029* (2013.01); *H04L 1/0675* (2013.01); *H04L 5/0035* (2013.01); *H04L 25/03343* (2013.01); *H04B 7/0413* (2013.01); *H04L 1/0026* (2013.01); *H04L 5/0023* (2013.01); *H04L 25/03866* (2013.01); *H04L 2025/03426* (2013.01); *H04L 2025/03808* (2013.01)

(56) References Cited

U.S. PATENT DOCUMENTS

| | | | | |
|---|---|---|---|---|
| 2008/0153428 | A1* | 6/2008 | Han | H04B 7/0417 455/69 |
| 2009/0041140 | A1* | 2/2009 | Xiao et al. | 375/260 |
| 2009/0252113 | A1* | 10/2009 | Take | 370/331 |
| 2009/0276684 | A1* | 11/2009 | Stewart et al. | 714/758 |
| 2010/0142633 | A1* | 6/2010 | Yu | H04B 7/0417 375/260 |
| 2010/0177844 | A1* | 7/2010 | Ko | H04L 5/0023 375/295 |
| 2010/0309998 | A1 | 12/2010 | Jung et al. | |

OTHER PUBLICATIONS

R1-083137 ("Aspects of Cooperative MIMO for Advanced E-UTRA", 3GPP TSG RAN WG1 #54, Aug. 18-22, 2008).*

R1-083546 ("Per-cell precoding methods for downlink joint processing CoMP", 3GPP TSG RAN WG1, Sep. 29-Oct. 3, 2008).*

3GPP TS 36.211 V8.6.0, (Mar. 2009), 3rd Generation Partnership Project; Technical Specification Group Radio Access Network; Evolved Universal Terrestrial Radio Access (E-UTRA); Physical Channels and Modulation, Release 8.

3GPP TS 36.213 V8.3.0, (May 2008), 3rd Generation Partnership Project; Technical Specification Group Radio Access Network; Evolved Universal Terrestrial Radio Access (E-UTRA); Physical Layer Procedures, Release 8.

ETRI, "Pre-cell precoding methods for downlink joint processing CoMP", Agenda Item 11, Study Item on LTE-Advanced, 3GPP TSG RAN WG1 Meeting #54bis, R1-083546, Sep. 29, 2008-Oct. 3, 2008, Prague, Czech Republic.

International Search Report, dated, Dec. 22, 2009, issued in PCT/JP2009/069146.

LG Electronics, "CQI contents & measurement for CoMP", Agenda Item 7.5, 3GPP TSG RAN WG1 Meeting #58bis, R1-094177, Oct. 12-16, 2009, Miyazaki, Japan.

LG Electronics, "UE Measurement and Feedback for DL CoMP", Agenda Item 15.2, 3GPP TSG RAN WG1 Meeting #56bis, R1-091193, Mar. 16-20, 2009, Seoul, Korea.

Qualcomm Europe, "Summary of email discussions for CoMP", Agenda Item 15.2, 3GPP TSG-RAN WG1 #57, R1-092232, May 4-8, 2009, San Francisco, CA, USA.

Sharp, "MBSFN Precoding with Antenna Selection for DL CoMP", Agenda Item 15.2, 3GPP TSG RAN WG1 Meeting #57, R1-092102, May 4-8, 2009, San Francisco, CA, USA.

Texas Instruments, "Aspects of Coordinated Multi-point Transmission for Advanced E-UTRA", Agenda Item 11, 3GPP TSG RAN WG1 #54bis, R1-083530, Sep. 29, 2008-Oct. 3, 2008, Prague, Czech Republic.

European Search Report issued in European Application No. 15000309.3 on May 27, 2015.

European Search Report Issued in European Application No. 09828972.1 on Jul. 17, 2014.

* cited by examiner

FIG. 3
CONVENTIONAL
ART
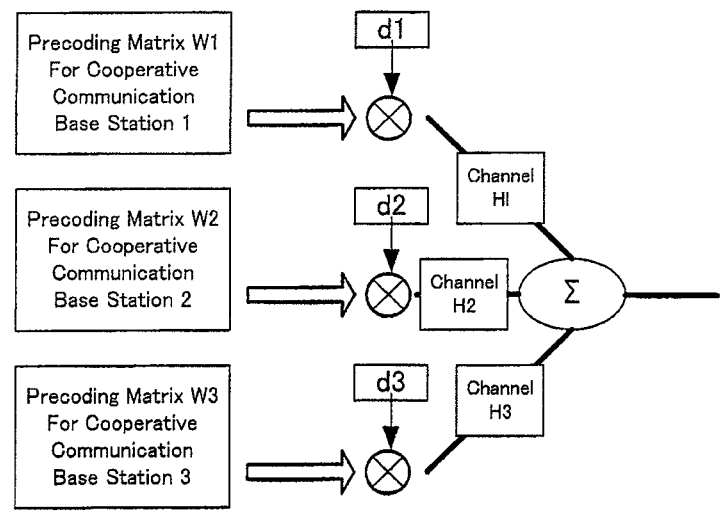
FIG. 4
CONVENTIONAL
ART
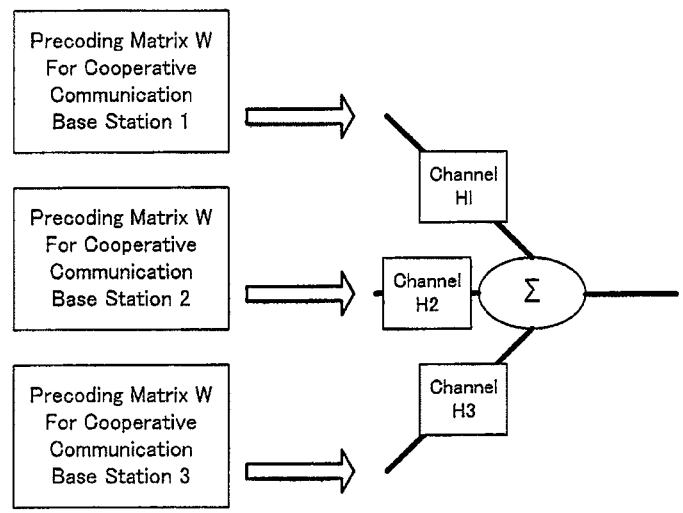

WIRELESS COMMUNICATIONS SYSTEM AND PRECODING METHOD

TECHNICAL FIELD

The present invention relates to a field of communication technology. In particular, the present invention relates to (i) a precoding method which, in a wireless communications system, employs a precoding technology for a cooperative communication between multiple multi-antenna base stations so as to improve a downlink data transmission rate, and (ii) a wireless communications system.

BACKGROUND ART

Multi-antenna (MIMO: Multiple Input Multiple Output) wireless telecommunications technology is a technology of achieving a spatial multiplexing effect and a space diversity effect by providing a plurality of antennas at each of a transmitting terminal and a receiving terminal so as to utilize spatial resources during a wireless telecommunication. Studies have shown that according to a theory of information, a capacity of a MIMO system increases linearly with an increase in a smaller one of (i) the number of transmit antennas and (ii) the number of receive antennas. FIG. 1 is a diagram schematically illustrating a MIMO system. As illustrated in FIG. 1, multi-antenna wireless channels formed by multiple antennas at each of the transmitting terminal and the receiving terminal include spatial information. Precoding technology is a major technology for improving a data transmission rate with use of current spatial information, and is also a technology which uses a channel state information pretreatment transmission signal. A precoder is substantially a multi-mode beam generator, and matches transmission signals with the channels for the transmitting terminal and the receiving terminal. A basic principle of precoding is that a precoder separates transmission signals into multiple layers and causes the multiple layers to be orthogonal to one another so that (i) transmission signals in each layer can obtain a large gain after passing through channels and (ii) independent orthogonality is ensured. There are at a maximum M data layers which are transmitted between the transmitting terminal and the receiving terminal and which are orthogonal to and independent of one another (where M is the smaller one of the respective numbers of antennas at the two terminals). Orthogonal frequency division multiplexing (OFDM) technology characteristically has a great anti-fading ability and a high efficiency in frequency use, and is thus used in a high-speed data communication in a multipath environment and a fading environment. MIMO-OFDM technology, which is a combination of MIMO technology and OFDM technology, is recognized as a core technology for next-generation mobile communications systems.

For example, the 3GPP (3rd Generation Partnership Project) organization, which is an international organization in a field of mobile communications technology, has been playing an important role in standardizing the 3G (3rd generation) cellular system. The 3GPP organization has been performing a project since a second half of 2004 to design EUTRA (Evolved Universal Terrestrial Radio Access) and EUTRAN (Evolved Universal Terrestrial Radio Access Network). This project is commonly called Long Term Evolution (LTE). MIMO-OFDM technology is used for a downlink communication in an LTE system. The 3GPP organization held a conference in Shenzhen, China, in April 2008 to discuss standardization of the 4G (4th Generation) cellular system. At this conference, a concept of "Coordinated multipoint (CoMP) transmission/reception" widely attracted attention and gained support. A core idea of the concept is that a plurality of base stations simultaneously provide a communication service to a single user or multiple users so as to improve a rate of transmitting data to a user on a cell border. To realize this plan, it is essential to use a precoding method for a cooperative communication between multiple multi-antenna base stations.

Three conventional techniques below have each been known as a method of a cooperative communication between multiple multi-antenna base stations for a downlink communication in a cellular system.

(1) Method of independently precoding transmission signals at a single base station and transmitting the transmission signals to a user device without modification: A serving base station and cooperative communication base stations perform precoding by a method involving a dispersion formula. Specifically, the serving base station and the cooperative communication base stations each have a precoding matrix which matches only a matrix for channels extending from the base station to a user device. Precoded signals are transmitted without modification from the serving base station and the cooperative communication base stations to the user device. The user device receives signals which have been (i) precoded by the method involving a dispersion formula, (ii) passed through their respective channels, and (iii) additively and directly combined with one another. The received signals can be expressed by the following numerical formula:

$$y = (\sqrt{P_1}H_1W_1 + \sqrt{P_2}H_2W_2 + \ldots + \sqrt{P_N}H_NW_N)x + n$$

y: received signal
x: transmission data
n: noise
N: total number of a serving base station and cooperative base stations
$\sqrt{P_1}, \sqrt{P_2}, \ldots, \sqrt{P_N}$: transmission electric power coefficients
$H_1, H_2, \ldots, H_N$: matrices for channels extending from a serving base station and cooperative base stations to a user device
$W_1, W_2, \ldots, W_N$: precoding matrices of a serving base station and cooperative base stations A core idea of this method (1) is that $W_1, W_2, \ldots, W_N$ match $H_1, H_2, \ldots, H_N$, respectively. FIG. 2 illustrates three base stations which employ this precoding method for a cooperative communication. This method is advantageous in that it can (i) be performed easily and flexibly and (ii) produce a good performance (see Non Patent Literature 1).

(2) Method of independently precoding transmission signals at a single base station, weighting a precoding matrix, and transmitting the transmission signals to a user device: To improve the performance produced by the method (1), this method (i) creates various weight values, that is, weight coefficients, (ii) weights a result of independent precoding at each base station with the weight coefficients, and (iii) transmits the weighted result to a receiving terminal. This method thus allows the receiving terminal to obtain a gain of coherent composition. The user device receives signals which have been (i) precoded by the method involving a dispersion formula, (ii) passed through their respective channels, and (iii) weighted, so that weighted results are combined with one another. The received signals can be expressed by the following numerical formula:

$$y = (\sqrt{P_1}H_1W_1d_1 + \sqrt{P_2}H_2W_2d_2 + \ldots + \sqrt{P_N}H_NW_Nd_N)x + n$$

y: received signal
x: transmission data
n: noise

N: total number of a serving base station and cooperative base stations $\sqrt{P_1}, \sqrt{P_2}, \ldots, \sqrt{P_N}$: transmission electric power coefficients $H_1, H_2, \ldots, H_N$: matrices for channels extending from a serving base station and cooperative base stations to a user device $W_1, W_2, \ldots, W_N$: precoding matrices of a serving base station and cooperative base stations $d_1, d_2, \ldots, d_N$: weight coefficients (which are each normally a value expressed as a complex number)

A core idea of this method (2) is that (i) $W_1, W_2, \ldots, W_N$ match $H_1, H_2, \ldots, H_N$, respectively, and (ii) each base station adjusts a phase of channel matching result so that the user device can superpose identical phases as much as possible for a gain of coherent composition. FIG. 3 illustrates three base stations which employ this cooperative precoding method. This method is advantageous in that it can produce a good performance (see Non Patent Literature 2).

(3) Method of an identically precoding transmission signals at a plurality of base stations and transmitting the transmission signals to a user device without modification: Complexity of identical precoding linearly increases with an increase in the total number of a serving base station and cooperative communication base stations. To reduce the complexity, a plurality of base stations employ an identical precoding matrix. The plurality of base stations can thus (i) match the precoding matrix with a matrix for channels extending from a serving base station and cooperative communication base stations to the user device, and then (ii) transmit the transmission signals to the user device without modification. From a standpoint of the user device, matrices for channels extending from a serving base station and cooperative communication base stations to the user device is directly combined first to provide equivalent virtual channels, and the matrices of channels are matched with an identical precoding matrix. The received signals can be expressed by the following numerical formula:

$$y = (\sqrt{P_1}H_1 + \sqrt{P_2}H_2 + \ldots + \sqrt{P_N}H_N) Wx + n$$

y: received signal x: transmission data n: noise

N: total number of a serving base station and cooperative base stations $\sqrt{P_1}, \sqrt{P_2}, \ldots, \sqrt{P_N}$: transmission electric power coefficients $H_1, H_2, \ldots, H_N$: matrices for channels extending from a serving base station and cooperative base stations to a user device W: identical precoding matrix employed by a serving base station and cooperative base stations FIG. 4 illustrates three base stations which employ this cooperative precoding method. This method is advantageous in that it can (i) be performed easily and (ii) reduce an amount of feedback information (see Non Patent Literature 2).

CITATION LIST

Non Patent Literature 1
3GPP, No. R1-083530, "Aspects of Cooperative MIMO for Advanced E-UTRA", Texas Instruments Non Patent Literature 2
3GPP, No. R1-083546, "Per-cell precoding methods for downlink joint processing CoMP", Electronics and Telecommunications Research Institute (ETRI)

SUMMARY OF INVENTION

Technical Problem

The above method (1), however, involves a large amount of signaling information in the precoding by the method involving a dispersion formula. This processing method involving a dispersion formula fails to make full use of a characteristic of cooperation between base stations, and there is still room for improvement in performance. The method (2) requires a complex operation in actuality and an extra amount of feedback information to check the weight values $d_1, d_2, \ldots, d_N$. The method (3) produces a poor performance.

As described above, each of the methods (1) and (2), which employ the distribution precoding method and can thus produce good performances, involves a complex precoding process and a large amount of feedback information. The method (3), which is the simplest of the three, produces a poor performance.

The present invention is based on the method (3) and has improvements over it. It is an object of the present invention to provide a precoding method for a cooperative communication between multiple multi-antenna base stations for a downlink communication which method (i) is easy to perform and (iii) produces an improved performance without largely increasing complexity.

Solution to Problem

According to a wireless communications system and a precoding method of the present invention, a serving base station and cooperative communication base stations employ an identical precoding matrix so as to each weight the precoding matrix and then transmit transmission signals. This improves a precoding function in a cooperative communication between multiple multi-antenna base stations. The weighting stands for multiplication of results of overall precoding or each layer precoding process by weight values at the serving base station and the cooperative communication base stations. A user device corresponding to the serving base station and the cooperative communication base stations receives a signal which is obtained by an operation in which the serving base station and the cooperative communication base stations perform an identical precoding process and additively combine results of overall precoding or each layer precoding process with one another. The user device feeds back information which includes (i) precoding matrix information for the serving base station and the cooperative communication base stations, (ii) weight vector information for either overall precoding or layer precoding, and (iii) a quantized value of channel quality. This feedback information is thus advantageous in that its signaling information amount is small. The serving base station share an identical cell number with the cooperative communication base stations. As such, in a case where an additively combined signal received by the user device is used, it is possible to obtain a larger gain of coherent composition.

In order to solve the above problem, a precoding method of the present invention is for use in a wireless communications system including (i) at least one user device, (ii) a serving base station for providing a service to the at least one user device, and (iii) at least one cooperative communication base station, the precoding method including the steps of: (A) the at least one user device estimating channel state information about downlink channels extending from the serving base station and the at least one cooperative communication base station to the at least one user device, the channel state information including at least (i) precoding matrix information, (ii) weight vector information for overall precoding, and (iii) a quantized value of channel quality; (B) the at least one user device feeding back the estimated channel state information to the serving base station; (C) the serving base station (i) performs resource scheduling according to the channel state information obtained from the at least one user device and (ii) notifying the at least one cooperative communication base station of at least a result of the resource scheduling, the precoding matrix information, and the weight vector information for overall precoding; and (D) the serving base station and the at least one cooperative communication base station (i) performing precoding with respect to communication data using an identical precoding matrix in correspondence with the precoding matrix information and (ii) each weighting a result of the precoding with a corresponding weight value included in the weight vector information.

In order to solve the above problem, a precoding method of the present invention is for use in a wireless communications system including (i) at least one user device, (ii) a serving base station for providing a service to the at least one user device, and (iii) at least one cooperative communication base station, the precoding method including the steps of: (A) the at least one user device estimating channel state information about downlink channels extending from the serving base station and the at least one cooperative communication base station to the at least one user device, the channel state information including at least (i) precoding matrix information, (ii) weight vector information for overall precoding, and (iii) a quantized value of channel quality; (B) the at least one user device feeding back the estimated channel state information to the serving base station and the at least one cooperative communication base station; (C) the serving base station (i) performs resource scheduling according to the channel state information obtained from the at least one user device and (ii) notifying the at least one cooperative communication base station of at least a result of the resource scheduling; and (D) the serving base station and the at least one cooperative communication base station (i) performing precoding with respect to communication data using an identical precoding matrix in correspondence with the precoding matrix information and (ii) each weighting a result of the precoding with a corresponding weight value included in the weight vector information.

In order to solve the above problem, a precoding method of the present invention is for use in a wireless communications system including (i) at least one user device, (ii) a serving base station for providing a service to the at least one user device, and (iii) at least one cooperative communication base station, the precoding method including the steps of: (A) the at least one user device estimating channel state information about downlink channels extending from the serving base station and the at least one cooperative communication base station to the at least one user device, the channel state information including at least (i) precoding matrix information, (ii) weight vector information for layer precoding, and (iii) a quantized value of channel quality; (B) the at least one user device feeding back the estimated channel state information to the serving base station; (C) the serving base station (i) performs resource scheduling according to the channel state information obtained from the at least one user device and (ii) notifying the at least one cooperative communication base station of at least a result of the resource scheduling, the precoding matrix information, and the weight vector information for layer precoding; and (D) the serving base station and the at least one cooperative communication base station (i) performing precoding with respect to communication data using an identical precoding matrix in correspondence with the precoding matrix information and (ii) each weighting a result of the precoding with a corresponding weight value included in the weight vector information.

In order to solve the above problem, a precoding method of the present invention is for use in a wireless communications system including (i) at least one user device, (ii) a serving base station for providing a service to the at least one user device, and (iii) at least one cooperative communication base station, the precoding method including the steps of: (A) the at least one user device estimating channel state information about downlink channels extending from the serving base station and the at least one cooperative communication base station to the at least one user device, the channel state information including at least (i) precoding matrix information, (ii) weight vector information for layer precoding, and (iii) a quantized value of channel quality; (B) the at least one user device feeding back the estimated channel state information to the serving base station and the at least one cooperative communication base station; (C) the serving base station (i) performs resource scheduling according to the quantized value included in the channel state information obtained from the at least one user device and (ii) notifying the at least one cooperative communication base station of at least a result of the resource scheduling; and (D) the serving base station and the at least one cooperative communication base station (i) performing precoding with respect to communication data using an identical precoding matrix in correspondence with the precoding matrix information and (ii) each weighting a result of the precoding with a corresponding weight value included in the weight vector information.

As described in an embodiment of the present invention, the configuration information preferably includes at least (i) cell number(s) of the at least one cooperative communication base station, (ii) a downlink data transmission method, and (iii) antenna configuration(s) of each of the serving base station and the at least one cooperative communication base station.

As described in the embodiment of the present invention, it is preferable that the step (A) includes estimating, in a predetermined precoding method, channel state information about the downlink channels extending from the serving base station and the at least one cooperative communication base station to the at least one user device; and the step (D) includes the serving base station and the at least one cooperative communication base station (i) performing, in the predetermined precoding method, precoding with respect to communication data on a basis of an identical precoding matrix and then (ii) each weighting a result of the precoding with a corresponding weight value.

As described in the embodiment of the present invention, it is preferable that the weight vector information for layer precoding includes a linear phase increasing sequence; and the weight vector information is an index number for indicating each of elements in the linear phase increasing sequence.

As described in the embodiment of the present invention, the precoding matrix information preferably is a code word in a precoding matrix codebook which code word indicates a precoding matrix.

As described in the embodiment of the present invention, it is preferable that the precoding matrix codebook is a high-dimensional precoding matrix, the method further including the step of: truncating the precoding matrix codebook so as to define a low-dimensional precoding matrix codebook.

As described in the embodiment of the present invention, the serving base station and the at least one cooperative communication base station preferably perform scrambling with respect to communication data using an identical cell scrambling sequence.

As described in the embodiment of the present invention, the cell scrambling sequence is preferably a cell scrambling sequence of the serving base station.

In order to solve the above problem, a wireless communications system of the present invention includes: at least one user device; a serving base station for providing a service to the at least one user device; and at least one cooperative communication base station, the at least one user device (i) estimating channel state information about downlink channels extending from the serving base station and the at least one cooperative communication base station to the at least one user device, the channel state information including at least precoding matrix information, weight vector information for overall precoding, and a quantized value of channel quality, and (ii) feeding back the estimated channel state information to the serving base station, the serving base station (i) performs resource scheduling according to the channel state information obtained from the at least one user device and (ii) notifying the at least one cooperative communication base station of at least a result of the resource scheduling, the precoding matrix information, and the weight vector information for overall precoding, the serving base station and the at least one cooperative communication base station (i) performing precoding with respect to communication data using an identical precoding matrix in correspondence with the precoding matrix information and (ii) each weighting a result of the precoding with a corresponding weight value included in the weight vector information.

In order to solve the above problem, a wireless communications system of the present invention includes: at least one user device; a serving base station for providing a service to the at least one user device; and at least one cooperative communication base station, the at least one user device (i) estimating channel state information about downlink channels extending from the serving base station and the at least one cooperative communication base station to the at least one user device, the channel state information including at least precoding matrix information, weight vector information for layer precoding, and a quantized value of channel quality, and (ii) feeding back the estimated channel state information to the serving base station and the at least one cooperative communication base station, the serving base station (i) performs resource scheduling according to the channel state information obtained from the at least one user device and (ii) notifying the at least one cooperative communication base station of at least a result of the resource scheduling, the serving base station and the at least one cooperative communication base station (i) performing precoding with respect to communication data using an identical precoding matrix in correspondence with the precoding matrix information and (ii) each weighting a result of the precoding with a corresponding weight value included in the weight vector information.

In order to solve the above problem, a wireless communications system of the present invention includes: at least one user device; a serving base station for providing a service to the at least one user device; and at least one cooperative communication base station, the at least one user device estimating channel state information about downlink channels extending from the serving base station and the at least one cooperative communication base station to the at least one user device, the channel state information including at least precoding matrix information, weight vector information for layer precoding, and a quantized value of channel quality, and feeding back the estimated channel state information to the serving base station, the serving base station (i) performs resource scheduling according to the channel state information obtained from the at least one user device and (ii) notifying to the at least one cooperative communication base station of at least a result of the resource scheduling, the precoding matrix information, and the weight vector information for layer precoding, the serving base station and the at least one cooperative communication base station (i) performing precoding with respect to communication data using an identical precoding matrix in correspondence with the precoding matrix information and (ii) each weighting a result of the precoding with a corresponding weight value included in the weight vector information.

In order to solve the above problem, a wireless communications system of the present invention includes: at least one user device; a serving base station for providing a service to the at least one user device; and at least one cooperative communication base station, the at least one user device (i) estimating channel state information about downlink channels extending from the serving base station and the at least one cooperative communication base station to the at least one user device, the channel state information including at least precoding matrix information, weight vector information for layer precoding, and a quantized value of channel quality, and (ii) feeding back the estimated channel state information to the serving base station and the at least one cooperative communication base station, the serving base station (i) performs resource scheduling according to the channel state information obtained from the at least one user device and (ii) notifying the at least one cooperative communication base station of at least a result of the resource scheduling, the serving base station and the at least one cooperative communication base station (i) performing precoding with respect to communication data using an identical precoding matrix in correspondence with the precoding matrix information and (ii) each weighting a result of the precoding with a corresponding weight value included in the weight vector information.

Additional objects, features, and strengths of the present invention will be made clear by the description below. Further, the advantages of the present invention will be evident from the following explanation in reference to the drawings.

Advantageous Effects of Invention

The precoding method and the wireless communications system of the present invention for a cooperative communication between multiple multi-antenna base stations for a downlink communication is advantageous in that it can be performed easily and produce a good performance.

BRIEF DESCRIPTION OF DRAWINGS

FIG. 3 is a diagram schematically illustrating a case in which a conventional method 2 is employed by three base stations which cooperatively communicate with one another.

FIG. 4 is a diagram schematically illustrating a case in which a conventional method 3 is employed by three base stations which cooperatively communicate with one another.

DESCRIPTION OF EMBODIMENTS

The following description deals in detail with a preferable embodiment of the present invention with reference to the drawings. To prevent difficulty in understanding the present invention, the description below omits to deal with arrangements and functions which are not necessary for a description of the present invention.

To specifically and clearly describe steps of performing the present invention, the description below deals with a specific embodiment in which the present invention is applied to an LTE cellular communications system. The present invention is, however, not at all limited to the embodiment below, and is thus also applicable to any other communications system such as a future LTE-Advanced system.

Figure 1:
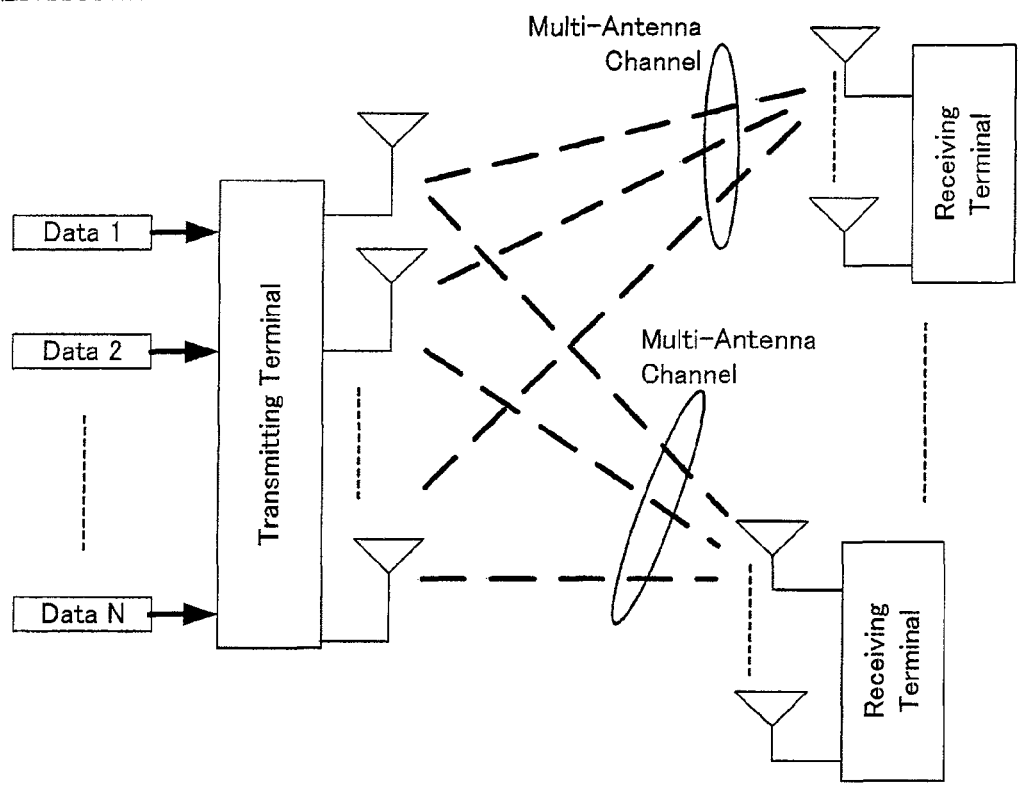
FIG. 1 is a diagram schematically illustrating a MIMO system.
Figure 2:
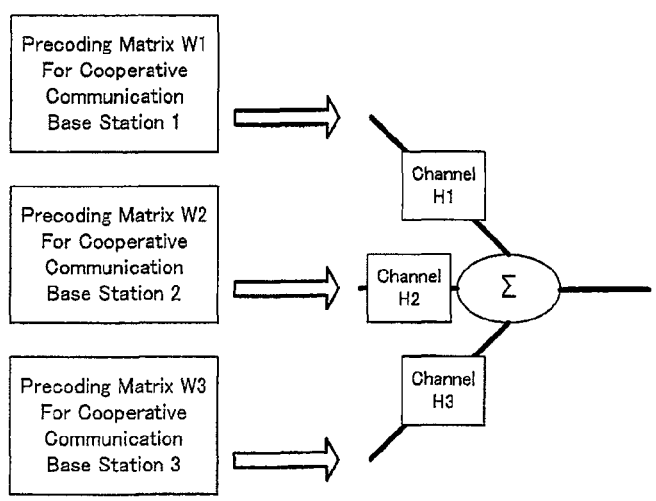
FIG. 2 is a diagram schematically illustrating a case in which a conventional method 1 is employed by three base stations which cooperatively communicate with one another.
Figure 5:
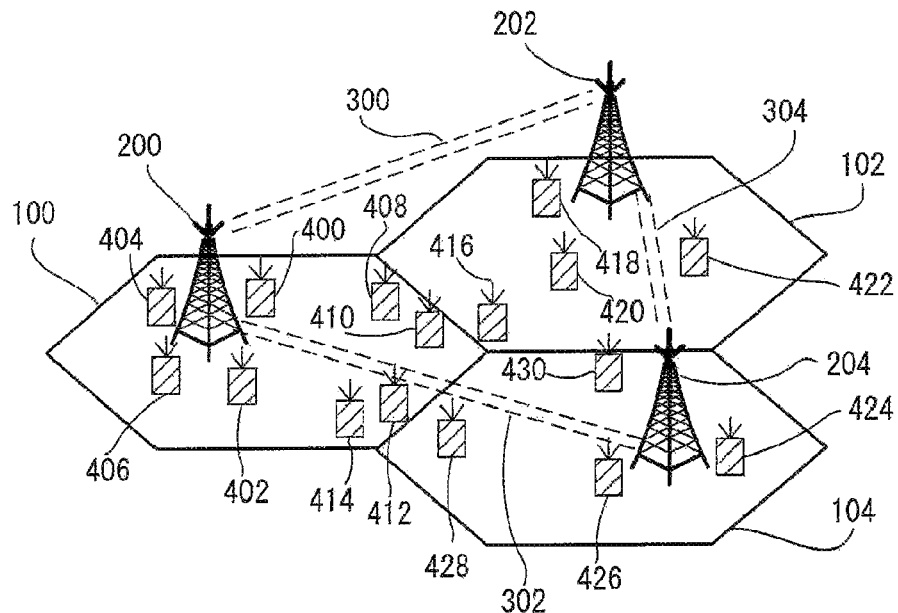
FIG. 5 is a diagram schematically illustrating a multi-cell cellular communications system.

FIG. 5 is a diagram schematically illustrating a multi-cell cellular communications system. The cellular system divides a service coverage area into individual wireless coverage areas (that is, cells) adjacent to one another. The cells are each in a shape of a regular hexagon in FIG. 5. The cells 100 through 104 joined together constitute the entire service area. The cellular communications system further includes base stations 200 through 204 in association with the cells 100 through 104, respectively. The base stations 200 through 204 each include at least one transmitter, at least one receiver, and at least one base station control unit as is publicly known in this technical field.

The base stations are each a service node in a corresponding cell. The base stations can each be (i) an independent base station having a function of scheduling wireless resources or (ii) a node dependent on an independent base station which node is, for example, a transmission node or a relay node (normally provided so as to expand a coverage area of a corresponding cell).

Each of the base stations 200 through 204 is provided in an area of one of the cells 100 through 104, and includes an omnidirectional antenna (see FIG. 5). Naturally, the cellular communications system can alternatively have a cell distribution in which at least one directivity antenna is (i) provided for a group of the base stations 200 through 204 and (ii) given a directivity so as to cover a partial area (normally referred to as "sector region") of the cells 100 through 104. As such, the multi-cell cellular communications system illustrated in FIG. 5 merely serves to describe the present invention. The cellular system of the present invention thus should not be limited in implementation to the above specific conditions.

In FIG. 5, the base stations 200 through 204 can communicate with one another via X2 interfaces 300 through 304 through a wireless or cable link. In an LTE system or a future LTE-Advanced system, a structure of a three-layer node network including base stations, a wireless network control unit, and a core network is simplified into a two-layer node structure. In this structure, the functions of the Radio Network Control is assigned to the base stations, and the base stations cooperate and communicate with one another via "X2" cable interfaces through a wireless or cable link.

In FIG. 5, the cells 100 through 104 contain a plurality of user devices (mobile stations) 400 through 430 distributed throughout. The user devices 400 through 430 each include at least one transmitter, at least one receiver, and at least one mobile station control unit as is publicly known in this technical field. In theoretical or/and physical terms, the user devices 400 through 430 each access the cellular communications system via a serving base station (that is, one of the base stations 200 through 204) which provides a service to the user device. In other words, each user device theoretically or/and physically belongs to a single serving base station.

Although FIG. 5 illustrates only 16 user devices provided, the number of user devices provided in actuality is extremely large. The user devices in FIG. 5 are thus merely schematically illustrated for a description of the present invention. As described above, in theoretical or/and physical terms, the user devices 400 through 430 each access the cellular communication network via one of the base stations 200 through 204 which one provides a service to the user device. In the description below, (i) a base station which provides a communication service directly to a user device is referred to as a serving base station for the user device, and (ii) any other base station is referred to as a non-serving base station or a cooperative communication base station for the user device. The non-serving base station can function as a cooperative communication base station for the serving base station and provide a communication service to the user device together with the serving base station.

The LTE system of the present embodiment is configured specifically in reference to the 3GPP organization's document TS 36.213 V8.3.0, "Evolved Universal Terrestrial Radio Access (E-UTRA); Physical Layer Procedures." The document defines seven downlink data transmission methods: single-antenna transmission; transmission diversity; open-loop space-division multiplexing; closed-loop space-division multiplexing; multiple-user MIMO; closed-loop single-layer precoding; and beam-forming transmission.

Specifically, single-antenna transmission is a method for transmitting signals with use of a single antenna, and is an exception for a MIMO system. This method allows transmission of only single-layer data. Transmission diversity is a method for transmitting signals in a MIMO system with use of a diversity effect of time and/or frequency. This method improves quality of received signals. Open-loop space-division multiplexing is space-division multiplexing which requires no feedback on channel state information from a user device. Closed-loop space-division multiplexing is space-division multiplexing which does require feedback on channel state information from a user device. Multiple-user MIMO is a method by which multiple users are involved in a downlink communication in a MIMO system at an identical time and at an identical frequency. Closed-loop single-layer precoding is a method which uses a MIMO system and which employs precoding technology. This method allows transmission of only single-layer data. Beam-forming transmission is a method which uses a MIMO system and which employs beam-forming technology. This method allows transmission of only single-layer data.

Out of the above seven downlink data transmission methods, closed-loop space-division multiplexing, multiple-user MIMO, and closed-loop single-layer precoding belong to precoding technology. The method of the present invention is thus applicable to the three methods out of the seven methods. Naturally, the above applications are each merely an embodiment of the present invention. The present invention is thus not limited in application to the three methods.

To further describe the embodiment of the present invention, the following description deals with example cases in each of which the present invention is applied to a cooperative communication as below between multiple multi-antenna base stations.

[Case 1]

The user device 416 is provided with two receive antennas, and is set so as to operate in a mode for a cooperative communication between multiple multi-antenna base stations for a downlink communication. The base station 202 is set as a serving base station, whereas the base stations 200 and 204 are each set as a cooperative communication base station. The base stations 200, 202, and 204 are each provided with four transmit antennas. The serving base station and the cooperative communication base stations for the user device 416 all employ an identical downlink data transmission method, specifically, closed-loop space-division multiplexing. According to this transmission method, the serving base station and the cooperative communication base stations each perform (i) overall precoding with respect to transmission data on the basis of an identical precoding matrix and (ii) weighting with respect to the transmission data so as to transmit the data. The weighting stands for multiplication of results of overall precoding by weight values (weight coefficients). Overall precoding stands for an operation in which transmission data which (i) is to be transmitted to a user device, (ii) has a plurality of transmission layers, and (iii) is to be multiplied by a precoding matrix is multiplied in its entirety by a precoding matrix without being divided into separate transmission data transmission layers (series or layers of transmission information). The results of overall precoding stand for transmission signals generated from overall precoding of the transmission data. The user device 416 receives a signal which is obtained by combining (adding at ends of the respective antennas) respective transmission signals transmitted by the serving base station and the cooperative communication base stations. The user device feeds back information which includes (i) precoding matrix information for the serving base station and the cooperative communication base stations (for example, a precoding matrix information index number), (ii) weight vector information for overall precoding, and (iii) a quantized value of channel quality. The weight vector information for overall precoding stands for vector information (for example, a weight vector information index number) indicative of a weight coefficient corresponding to one of the above base stations. The quantized value of channel quality stands for a discretized value indicative of a state (quality) of downlink channels between (i) the user device and (ii) the serving base station and the cooperative communication base stations.

[Case 2]

The user device 416 is provided with two receive antennas, and is set so as to operate in a mode for a cooperative downlink communication between multiple multi-antenna base stations. The base station 202 is set as a serving base station, whereas the base stations 200 and 204 are each set as a cooperative communication base station. The base stations 200, 202, and 204 are each provided with four transmit antennas. The serving base station and the cooperative communication base stations for the user device 416 all employ an identical downlink data transmission method, specifically, closed-loop space-division multiplexing. According to this transmission method, the serving base station and the cooperative communication base stations each perform (i) division of transmission data into a plurality of transmission layers, (ii) layer precoding for each transmission data transmission layer on the basis of an identical precoding matrix, and (iii) weighting with respect to each transmission layer so as to transmit the transmission data. The weighting stands for multiplication of results of layer precoding by weight values (weight coefficients). Layer precoding stands for an operation in which transmission data which (i) is to be transmitted to a user device and (ii) has a plurality of transmission layers is divided into separate transmission layers (series or layers of transmission information), each of which is then multiplied by a layer precoding matrix corresponding to the transmission data transmission layer. The results of layer precoding stand for transmission signals generated from layer precoding of each transmission data transmission layer. The user device 416 receives a signal which is obtained by combining (adding at ends of the respective antennas) respective transmission signals transmitted by the serving base station and the cooperative communication base stations. The user device feeds back information which includes (i) precoding matrix information (for example, a precoding matrix information index number) for the serving base station and the cooperative communication base stations, (ii) weight vector information for layer precoding, and (iii) a quantized value of channel quality. The weight vector information for layer precoding stands for information (for example, a weight vector information index number) indicative of a weight value by which one of the precoded transmission layers is multiplied. The quantized value of channel quality stands for a discretized value indicative of a state (quality) of downlink channels between (i) the user device and (ii) the serving base station and the cooperative communication base stations.

[Case 3]

The user device 416 is provided with two receive antennas, and is set so as to operate in a mode for a cooperative downlink communication between multiple multi-antenna base stations. The base station 202 is set as a serving base station, whereas the base stations 200 and 204 are each set as a cooperative communication base station. The base stations 200 and 202 are each provided with four transmit antennas, whereas the base station 204 is provided with two transmit antennas. The serving base station and the cooperative communication base stations for the user device 416 all employ an identical downlink data transmission method, specifically, closed-loop space-division multiplexing. According to this transmission method, the serving base station and the cooperative communication base stations each perform (i) division of transmission data into a plurality of transmission layers, (ii) layer precoding for each transmission data transmission layer on the basis of an identical precoding matrix, and (iii) weighting with respect to each transmission layer so as to transmit the transmission data. The weighting stands for multiplication of results of each layer precoding process (that is, each precoded transmission data transmission layer) by weight values. The user device 416 receives a signal which is obtained by combining (adding at ends of the respective antennas) respective transmission signals transmitted by the serving base station and the cooperative communication base stations. The user device feeds back information which includes (i) precoding matrix information for the serving base station and the cooperative communication base stations, (ii) weight vector information for layer precoding, and (iii) a quantized value of channel quality. The weight vector information for layer precoding stands for information indicative of a weight value by which one of the precoded transmission layers is multiplied.

The respective definitions of the terms "layer precoding" and "results of layer precoding" are as described in the Case 2.

[Case 4]

The user device 416 is provided with two receive antennas, and is set so as to operate in a mode for a cooperative downlink communication between multiple multi-antenna base stations. The base station 202 is set as a serving base station, whereas the base stations 200 and 204 are each set as a cooperative communication base station. The base stations 200 and 202 are each provided with four transmit antennas, whereas the base station 204 is provided with two transmit antennas. The serving base station and the cooperative communication base stations for the user device 416 all employ an identical downlink data transmission method, specifically, closed-loop space-division multiplexing. According to this transmission method, the serving base station and the cooperative communication base stations each perform (i) layer precoding for each transmission data transmission layer on the basis of an identical precoding matrix and (ii) weighting with respect to each transmission layer so as to transmit the transmission data. The weighting stands for multiplication of results of overall precoding by weight values. The user device 416 receives a signal which is obtained by combining (adding at ends of the respective antennas) transmission signals transmitted by the serving base station and the cooperative communication base stations. The user device feeds back information which includes (i) precoding matrix information (for example, a precoding matrix information index number) for the serving base station and the cooperative communication base stations, (ii) weight vector information for overall precoding, and (iii) a quantized value of channel quality. The weight vector information for overall precoding stands for an item of vector information (for example, a weight vector information index number) indicative of (i) a weight coefficient corresponding to one of the above base stations and (ii) a weight value by which one of a plurality of overall precoded transmission data sets is multiplied. The respective definitions of the terms "overall precoding" and "results of overall precoding" are as described in the Case 1.

The user device feeds back information as described in the 3GPP organization's document TS 36.211 V8.3.0, "Evolved Universal Terrestrial Radio Access (E-UTRA); Physical Channels and Modulation." This document defines on pages 51 and 52 precoding matrix information (precoding matrix information index numbers) based on a codebook. A basic idea is as follows: Space is divided on the basis of code words (predetermined matrices). A channel is then approximated with use of the code words so as to be similar to an actual channel. A code word which allows the channel to be the most similar to the actual channel provides a quantization matrix for the actual channel, and an index number of the code word serves as a quantized value of the actual channel. The user device determines channel information and feeds it back to a corresponding base station. A base station provided with four transmit antennas transmits data having four layers at a maximum, namely the first to fourth layers, each of which contains 16 code words (index numbers 0 through 15) to be selected from by a user device. A base station provided with two transmit antennas transmits data having two layers at a maximum, namely the first and second layers, each of which contains four code words (index numbers 0 through 3) to be selected from by a user device.

The weight vector information for either overall precoding or layer precoding is a concept which an LTE system lacks. As such, it is necessary to set a codebook corresponding to the weight vector information. The embodiment of the present invention, while taking into consideration a linear phase increasing sequence, defines a codebook which indicates eight code words as weight vectors for either overall precoding or layer precoding as shown in Table 1 (where N represents a total number of a serving base station and cooperative communication base stations). The index numbers of the code words ("Numbers of code words" in Table 1) each represent a result of quantization (corresponding to the above-described quantized value of channel quality) of a weight vector for either overall precoding or layer precoding. The index numbers are fed back by a user device to a corresponding base station.

TABLE 1

Codebook of Weight Vectors for Overall Precoding or Layer Precoding

| Numbers of code words | Code words |
| --- | --- |
| 0 | $[1, \exp(-j\phi_0), \exp(-j2\phi_0), \exp(-j3\phi_0), \ldots, \exp(-j(N-1)\phi_0)]$ <br> ($\phi_0 = 0$) |
| 1 | $[1, \exp(-j\phi_1), \exp(-j2\phi_1), \exp(-j3\phi_1), \ldots, \exp(-j(N-1)\phi_1)]$ <br> ($\phi_1 = 2\pi(1/8) = \pi/4$) |
| 2 | $[1, \exp(-j\phi_2), \exp(-j2\phi_2), \exp(-j3\phi_2), \ldots, \exp(-j(N-1)\phi_2)]$ <br> ($\phi_2 = 2\pi(2/8) = \pi/2$) |
| 3 | $[1, \exp(-j\phi_3), \exp(-j2\phi_3), \exp(-j3\phi_3), \ldots, \exp(-j(N-1)\phi_3)]$ <br> ($\phi_3 = 2\pi(3/8) = 3\pi/4$) |
| 4 | $[1, \exp(-j\phi_4), \exp(-j2\phi_4), \exp(-j3\phi_4), \ldots, \exp(-j(N-1)\phi_4)]$ <br> ($\phi_4 = 2\pi(4/8) = \pi$) |
| 5 | $[1, \exp(-j\phi_5), \exp(-j2\phi_5), \exp(-j3\phi_5), \ldots, \exp(-j(N-1)\phi_5)]$ <br> ($\phi_5 = 2\pi(5/8) = 5\pi/4$) |
| 6 | $[1, \exp(-j\phi_6), \exp(-j2\phi_6), \exp(-j3\phi_6), \ldots, \exp(-j(N-1)\phi_6)]$ <br> ($\phi_6 = 2\pi(6/8) = 3\pi/2$) |
| 7 | $[1, \exp(-j\phi_7), \exp(-j2\phi_7), \exp(-j3\phi_7), \ldots, \exp(-j(N-1)\phi_7)]$ <br> ($\phi_7 = 2\pi(7/8) = 7\pi/4$) |

The above description naturally merely deals, as an example to illustrate the embodiment of the present invention, with (i) cases of how a cooperative communication between multiple multi-antenna base stations is performed, (ii) a method of quantizing precoding matrix information, and (iii) a method of quantizing information about a weight vector for either overall precoding or layer precoding. The present invention is thus not necessarily performed under the above limitative conditions. The above cases of the embodiment are each mainly described from a standpoint of the user device 416. This, however, does not mean that the present invention can be performed only in an application involving a single user device. The present invention is in practice applicable also to a case involving multiple user devices. Any user device such as the user devices 408, 410, and 430 in FIG. 5 can use the method of the present invention. In addition, the above cases of the embodiment each involve one serving base station and two cooperative communication base stations. The present invention is, however, not necessarily limited to such a condition. The present invention is in practice not limited in the number of serving base stations or cooperative communication base stations.

Figure 6:
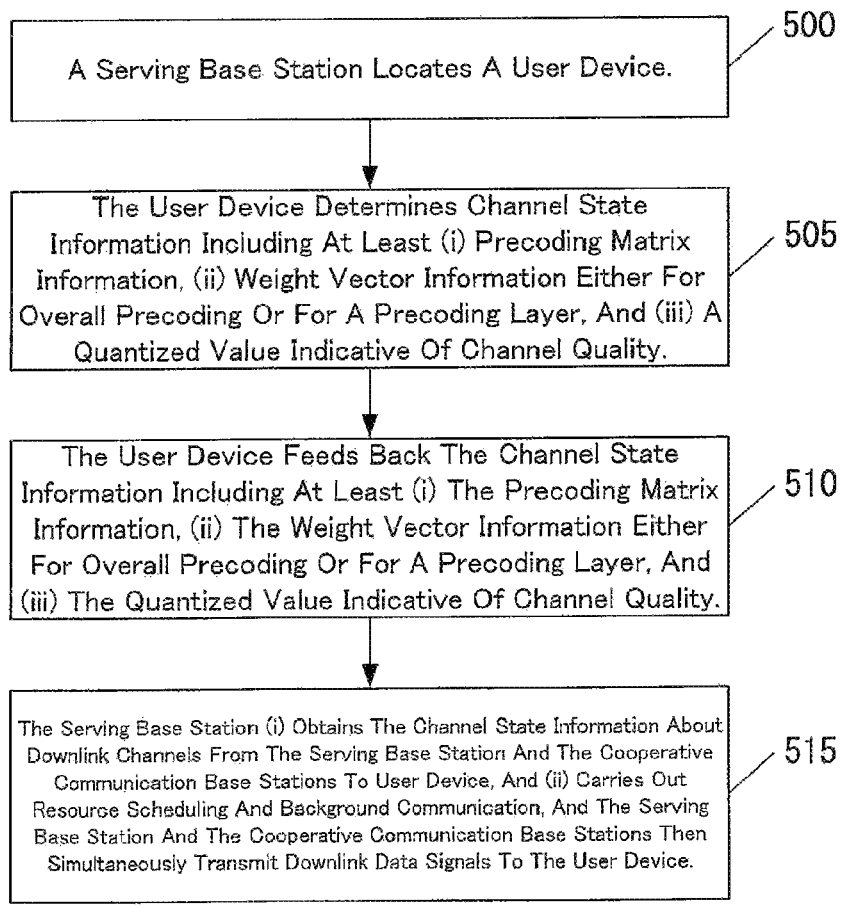
FIG. 6 is a flowchart illustrating a precoding method of an embodiment of the present invention for a cooperative communication between multiple multi-antenna base stations.

FIG. 6 is a flowchart illustrating a method of the embodiment of the present invention for a cooperative communication between multiple multi-antenna base stations for a downlink communication in a cellular system. As illustrated in FIG. 6, the method includes steps 500, 505, 510, and 515. During the step 500, a serving base station configures a user device. During the step 505, the user device estimates, by the precoding method for a cooperative communication between multiple multi-antenna base stations, channel state information including at least (i) precoding matrix information, (ii) weight vector information for either overall precoding or layer precoding, and (iii) a quantized value of channel quality. During the step 510, the user device feeds back channel state information including at least (i) precoding matrix information, (ii) weight vector information for either overall precoding or layer precoding, and (iii) a quantized value of channel quality. During the step 515, the serving base station (i) obtains the channel state information about downlink channels extending from the serving base station and cooperative communication base stations to the user device, (ii) performs resource scheduling according to the quantized value of channel quality (for example, selects a channel whose quantized value of channel quality is large), and (iii) transmits, to the cooperative communication base stations by a background communication (for example, via X2 interfaces), a result of the resource scheduling, communication data, the precoding matrix information, and the weight vector information for precoding. Then, later during the step 515, the serving base station and the cooperative communication base stations simultaneously transmit downlink data signals to the user device. The following description deals with the above steps in detail.

During the step 500, a serving base station configures a user device. Specifically, a serving base station associates a user device with each of the serving base station and cooperative communication base stations. Downlink communication data for a cooperative communication between base stations is transmitted to the user device. The serving base station then generates configuration information indicative of the association. How the serving base station associates the user device with at least one cooperative communication base station is not particularly limited. For example, the serving base station can (i) select, from among cells that are adjacent to a cell to which the serving base station belongs, a predetermined number of cells in order of proximity to the user device, and (ii) designate, as cooperative communication base stations, base stations provided in respective cells thus selected.

The configuration information preferably includes at least (i) cell numbers for the respective cooperative communication base stations, (ii) a method for transmitting downlink data, and (iii) configuration of antennas at each of the serving base station and the cooperative communication base stations.

In specific applications, the cell numbers for the respective cooperative communication base stations and the method for transmitting downlink data are normally communicated from the serving base station to the user device by downlink control signaling, and the antenna configuration is communicated to the user device through broadcast channels of the respective base stations (that is, the serving base station and the cooperative communication base stations). The antenna configuration stands for the number of transmit antennas provided for the serving base station and the cooperative communication base stations.

In the present embodiment, the step 500 is performed as in the following three example applications:

[Example Application in Case 1]

The serving base station for the user device 416 is the base station 202, and the cooperative communication base stations for the user device 416 are the base stations 200 and 204. The base stations 200, 202, and 204 communicate information about antenna configuration to the user device through their respective broadcast channels. The base stations 200, 202, and 204 are each provided with four transmit antennas as its antenna configuration. The serving base station 202 transmits, to the user device 416 by downlink control signaling, information indicative of (i) the cell numbers for the respective cooperative communication base stations 200 and 204 and (ii) a downlink data transmission method (closed-loop space-division multiplexing in this application).

[Example Application in Case 2]

The serving base station for the user device 416 is the base station 202, and the cooperative communication base stations for the user device 416 are the base stations 200 and 204. The base station 202 communicates information about its antenna configuration to the user device through a broadcast channel. The base station 202 is provided with four transmit antennas as its antenna configuration. The serving base station 202 transmits, to the user device 416 by downlink control signaling, information indicative of (i) the cell numbers for the respective cooperative communication base stations 200 and 204, (ii) the antenna configuration (four transmit antennas), and (iii) a downlink data transmission method (closed-loop space-division multiplexing in this application).

[Example Application in Case 3]

The serving base station for the user device 416 is the base station 202, and the cooperative communication base stations for the user device 416 are the base stations 200 and 204. The base stations 200 and 202 communicate information about antenna configuration to the user device through their respective broadcast channels. The base stations 200 and 202 are each provided with four transmit antennas as its antenna configuration. The base station 204, through its broadcast channel, communicates information about its antenna configuration to the user device. The base station 204 is provided with two transmit antennas as its antenna configuration. The serving base station 202 transmits, to the user device 416 by downlink control signaling, information indicative of (i) the cell numbers for the respective cooperative communication base stations 200 and 204 and (ii) a downlink data transmission method (closed-loop space-division multiplexing in this application).

The above example applications are, as described above, each merely an example of a serving base station locating a user device in accordance with the present invention. The example applications thus do not serve to limit the configuration information of a serving base station of the present invention to the above form described in the example applications.

During the step 505, the user device estimates channel state information by the precoding method for a cooperative communication between multiple multi-antenna base stations. The channel state information includes at least (i) precoding matrix information, (ii) weight vector information for either overall precoding or layer precoding, and (iii) a quantized value of channel quality.

Normally, the user device can, after obtaining system information about the serving base station and the cooperative communication base stations, detect downlink reference signals from the serving base station and the cooperative communication base stations. As such, the user device can obtain channel state information about the serving base station and the cooperative communication base stations, and thus estimate channel state information.

According to the precoding method for a cooperative communication between multiple multi-antenna base stations, the serving base station and the cooperative communication base stations employ an identical precoding matrix so as to weight transmission signals and then transmit them. The serving base station and the cooperative communication base stations preferably perform the weighting by multiplying results of overall precoding by weight values.

According to the precoding method for a cooperative communication between multiple multi-antenna base stations, the serving base station and the cooperative communication base stations employ an identical precoding matrix so as to weight transmission signals and then transmit them. The serving base station and the cooperative communication base stations preferably perform the weighting by multiplying results of layer precoding by weight values.

In the present embodiment, the step 505 is described with reference to four example applications below.

[Example Application in Case 1]

Suppose that (i) the user device 416 is provided with two receive antennas, (ii) the serving base station for the user device 416 is the base station 202, and the cooperative communication base stations for the user device 416 are the base stations 200 and 204. The base stations 200, 202, and 204 are each provided with four transmit antennas. Suppose also that (i) $H_{202}$ represents a matrix of channels (2×4 matrix; a first dimension of the channel matrix corresponds to the number of receive antennas, and a second dimension of the channel matrix corresponds to the number of transmit antennas) extending from the serving base station 202 to the user device 416, and (ii) $H_{200}$ and $H_{204}$ represent respective matrices of channels (2×4 matrices) extending from the cooperative communication base stations 200 and 204 to the user device 416. In a case where (i) the base stations 200, 202, and 204 all employ closed-loop space-division multiplexing and (ii) the number of transmission layers for transmission data is two, the precoding matrix is 4×2 in dimension (where the first dimension of the precoding matrix represents the number of transmit antennas, and the second dimension of the precoding matrix represents the number of transmission layers). According to a description on page 52 of the 3GPP organization's document TS 36.211 V8.3.0, "Evolved Universal Terrestrial Radio Access (E-UTRA); Physical Channels and Modulation," a precoding matrix codebook contains a total of 16 code words, which are set as $W_0, W_1, \ldots, W_{15}$.

The serving base station 202 and the cooperative communication base stations 200 and 204 employ an identical precoding matrix so as to weight transmission signals and then transmit them. The weighting stands for an operation in which the serving base station 202 and the cooperative communication base stations 200 and 204 multiply results of overall precoding by a weight vector $D_i$. Since the three base stations cooperate with one another, the weight vector for precoding is expressed as $D_i=[d_i^{202}, d_i^{200}, d_i^{204}]$, where $d_i^{202}$, $d_i^{200}$, $d_i^{204}$ represent weight values for the base stations 202, 200, and 204, respectively. The codebook shown in Table 1 above of weight vectors for overall precoding, which codebook is an example of precoding in accordance with the present embodiment, shows eight code words to select from, and thus indicates that $i=0, 1, \ldots, 7$.

Code word $D_0$:

$[1, \exp(-j\phi_0), \exp(-j2\phi_0)]$ ($\phi_0=0$)

Code word $D_1$:

$[1, \exp(-j\phi_1), \exp(-j2\phi_1)]$ ($\phi_1=2\pi(1/8)=\pi/4$)

Code word $D_2$:

$[1, \exp(-j\phi_2), \exp(-j2\phi_2)]$ ($\phi_2=2\pi(2/8)=\pi/2$)

Code word $D_3$:

$[1, \exp(-j\phi_3), \exp(-j2\phi_3)]$ ($\phi_3=2\pi(3/8)=3\pi/4$)

Code word $D_4$:

$[1, \exp(-j\phi_4), \exp(-j2\phi_4)]$ ($\phi_4=2\pi(4/8)=\pi$)

Code word $D_5$:

$[1, \exp(-j\phi_5), \exp(-j2\phi_5)]$ ($\phi_5=2\pi(5/8)=5\pi/4$)

Code word $D_6$:

$[1, \exp(-j\phi_6), \exp(-j2\phi_6)]$ ($\phi_6=2\pi(6/8)=3\pi/2$)

Code word $D_7$:

$[1, \exp(-j\phi_7), \exp(-j2\phi_7)]$ ($\phi_7=2\pi(7/8)=7\pi/4$)

Figure 7:
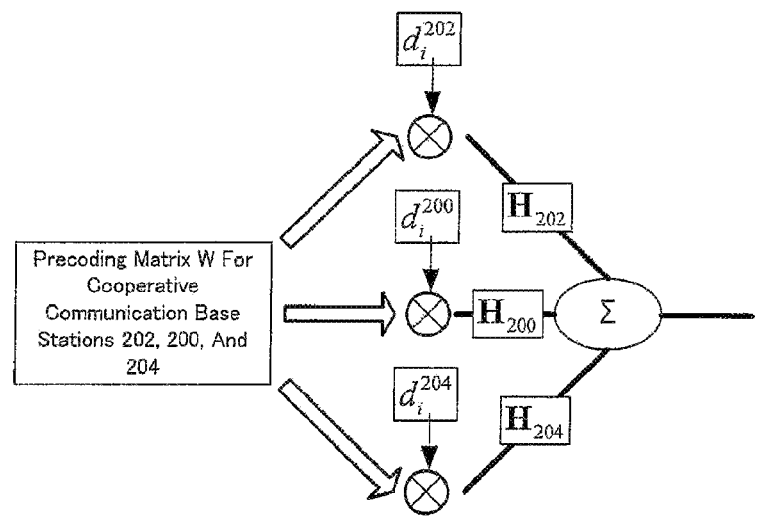
FIG. 7 is a diagram schematically illustrating an example case 1 in which the method of the present invention is employed by three cooperatively communicating base stations.

The user device 416 receives signals which are obtained as a result of an operation in which the serving base station 202 and the cooperative communication base stations 200 and 204 perform identical overall precoding and additively combine results of an overall precoding process with one another. FIG. 7 illustrates an example of how this operation is performed.

For the user device 416, the matrices of channels extending from the serving base station 202 and the cooperative communication base stations 200 and 204 to the user device 416 provide virtual channels through $D_i$ additive combinations. Further, the virtual channels are matched with the identical precoding matrix W. This can be expressed by the following numerical formula:

$$y(\sqrt{P_{202}}H_{202}d_i^{202}+\sqrt{P_{200}}H_{200}d_i^{200}+\sqrt{P_{204}}H_{204}d_i^{204})Wx+n$$

y: received signal
x: transmission data
n: noise
$\sqrt{P_{202}}, \sqrt{P_{200}}, \sqrt{P_{204}}$: transmission electric power coefficients
W: identical precoding matrix employed by a serving base station and cooperative base stations The virtual channels can thus be expressed by the following numerical formula:

$$H_i=\sqrt{P_{202}}H_{202}d_i^{202}+\sqrt{P_{200}}H_{200}d_i^{200}+\sqrt{P_{204}}H_{204}d_i^{204}$$
$$(i=0,1,\ldots,7)$$

In a case where the user device 416 performs singular value decomposition with respect to $H_i$ representing eight candidates, the following numerical formula can be obtained:

$$H_i=U_i^H\Lambda_i V_i$$

$U_i^H$: left singular matrix (2×2 unitary matrix)
$\Lambda_i$: eigenvalue matrix of $H_i$ (2×4 general diagonal matrix)
$V_i$: right singular matrix of $H_i$ (4×4 unitary matrix)

The user device 416 then finds a sum of squares of diagonal modes for $\Lambda_i$ to determine an electric power gain $G_i$ for $H_i$. As such, the user device 416 can determine an index number x for a suitable weight vector $D_x$ by the following Formula (1):

$$x = \underset{i=0,1,\ldots,7}{\arg\max}\{G_i\} \qquad (1)$$

After determining the index number x, the user device 416 obtains a virtual channel $H_x$, and selects a suitable precoding matrix $W_h$ from $W_0, W_1, \ldots, W_{15}$ so as to match it with $H_x$. The user device 416 can determine an index number h by the following Formula (2):

$$h = \underset{j=0,1,\ldots,15}{\arg\max}\{\|H_x W_j\|^2\} \qquad (2)$$

In Formula (2), "$\|\cdot\|^2$" stands for a square of a mode in a matrix, and indicates an electric power gain obtained for Hx as an amount of electric power after a precoding process. The electric power gain can alternatively be expressed as an amount Q indicative of channel quality as in the following Formula (3):

$$Q = \|H_x W_h\|^2$$

$$\tilde{Q} = quant\{Q\} \quad (3)$$

In Formula (3), "quant{·}" stands for a quantization process. A quantized value $\tilde{Q}$ of Q can alternatively be expressed as a quantized value of channel quality.

In the present embodiment, the estimation of channel information by a user device includes at least finding one precoding matrix index number h, one precoding weight vector index number x, and one quantized value $\tilde{Q}$ of channel quality.

In this example application, (i) the index number x is obtained from Formula (1), (ii) the index number h and the quantized value $\tilde{Q}$ of channel quality are obtained from Formulae (2) and (3), respectively, and (iii) the precoding weight vector codebook $\{D_i\}$ of and the precoding matrix codebook $\{W_j\}$ are obtained. This is, however, merely an example which serves to illustrate feasibility of the present invention. In specific applications, the precoding weight vector codebook $\{D_i\}$ and the precoding matrix codebook $\{W_j\}$ can each have a design other than the above example. Such design variation does not influence the feasibility of the present invention. The index number x, the index number h, and the quantized value $\tilde{Q}$ of channel quality can alternatively be obtained by a combined estimating method as in the following Formula (4):

$$(x, h) = \underset{[x|i=0,1,\ldots,7][h|j=0,1,\ldots,15]}{\arg\max} \{\|H_i W_j\|^2\}$$

$$Q = \|H_x W_h\|^2$$

$$\tilde{Q} = quant\{Q\}$$

[Example Application in Case 2]

Suppose that (i) the user device 416 is provided with two receive antennas, (ii) the serving base station for the user device 416 is the base station 202, and the cooperative communication base stations for the user device 416 are the base stations 200 and 204. The base stations 200, 202, and 204 are each provided with four transmit antennas. Suppose also that (i) $H_{202}$ represents a matrix of channels (2×4 matrix; a first dimension of the channel matrix corresponds to the number of receive antennas, and a second dimension of the channel matrix corresponds to the number of transmit antennas) from the serving base station 202 to the user device 416, and (ii) $H_{200}$ and $H_{204}$ represent respective matrices of channels (2×4 matrices) from the cooperative communication base stations 200 and 204 to the user device 416. In a case where (i) the base stations 200, 202, and 204 all employ closed-loop space-division multiplexing and (ii) the number of transmission layers is two, the precoding matrix is 4×2 in dimension (where the first dimension of the precoding matrix represents the number of transmit antennas, and the second dimension of the precoding matrix represents the number of transmission layers). According to a description on page 52 of the 3GPP organization's document TS 36.211 V8.3.0, "Evolved Universal Terrestrial Radio Access (E-UTRA); Physical Channels and Modulation," a precoding matrix codebook contains a total of 16 code words, which are set as $W_0, W_1, \ldots, W_{15}$.

The serving base station 202 and the cooperative communication base stations 200 and 204 employ an identical precoding matrix so as to weight transmission signals and then transmit them. The weighting stands for an operation in which the serving base station 202 and the cooperative communication base stations 200 and 204 multiply results of each layer precoding process by a weight vector $D_{i(l)}$ (where l is an index number for a transmission data transmission layer; l=1, 2). Since the three base stations cooperate with one another, the weight vector for layer precoding for an l-th layer is expressed as $D_{i(l)} = [d_{i(l)}^{202}, d_{i(l)}^{200}, d_{i(l)}^{204}]$, where $d_{i(l)}^{202}$, $d_{i(l)}^{200}$, $d_{i(l)}^{204}$ represent respective weight values for results of precoding an l-th layer of each of the base stations 202, 200, and 204. The codebook shown in Table 1 above of weight vectors for layer precoding, which codebook is an example of precoding in accordance with the present embodiment, shows eight code words to select from, and thus indicates that i=0, 1, . . . , 7.

Code word $D_{0(l)}$:

[1, $\exp(-j\phi_0)$, $\exp(-j2\phi_0)$] ($\phi_0=0$)

Code word $D_{1(l)}$:

[1, $\exp(-j\phi_1)$, $\exp(-j2\phi_1)$] ($\phi_1=2\pi(1/8)=\pi/4$)

Code word $D_{2(l)}$:

[1, $\exp(-j\phi_2)$, $\exp(-j2\phi_2)$] ($\phi_2=2\pi(2/8)=7\pi/2$)

Code word $D_{3(l)}$:

[1, $\exp(-j\phi_3)$, $\exp(-j2\phi_3)$] ($\phi_3=2\pi(3/8)=3\pi/4$)

Code word $D_{4(l)}$:

[1, $\exp(-j\phi_4)$, $\exp(-j2\phi_4)$] ($\phi_4=2\pi(4/8)=\pi$)

Code word $D_{5(l)}$:

[1, $\exp(-j\phi_5)$, $\exp(-j2\phi_5)$] ($\phi_5=2\pi(5/8)=5\pi/4$)

Code word $D_{6(l)}$

:[1, $\exp(-j\phi_6)$, $\exp(-j2\phi_6)$] ($\phi_6=2\pi(6/8)=3\pi/2$)

Code word $D_{7(l)}$

:[1, $\exp(-j\phi_7)$, $\exp(-j2\phi_7)$] ($\phi_7=2\pi(7/8)=7\pi/4$)

Figure 8:
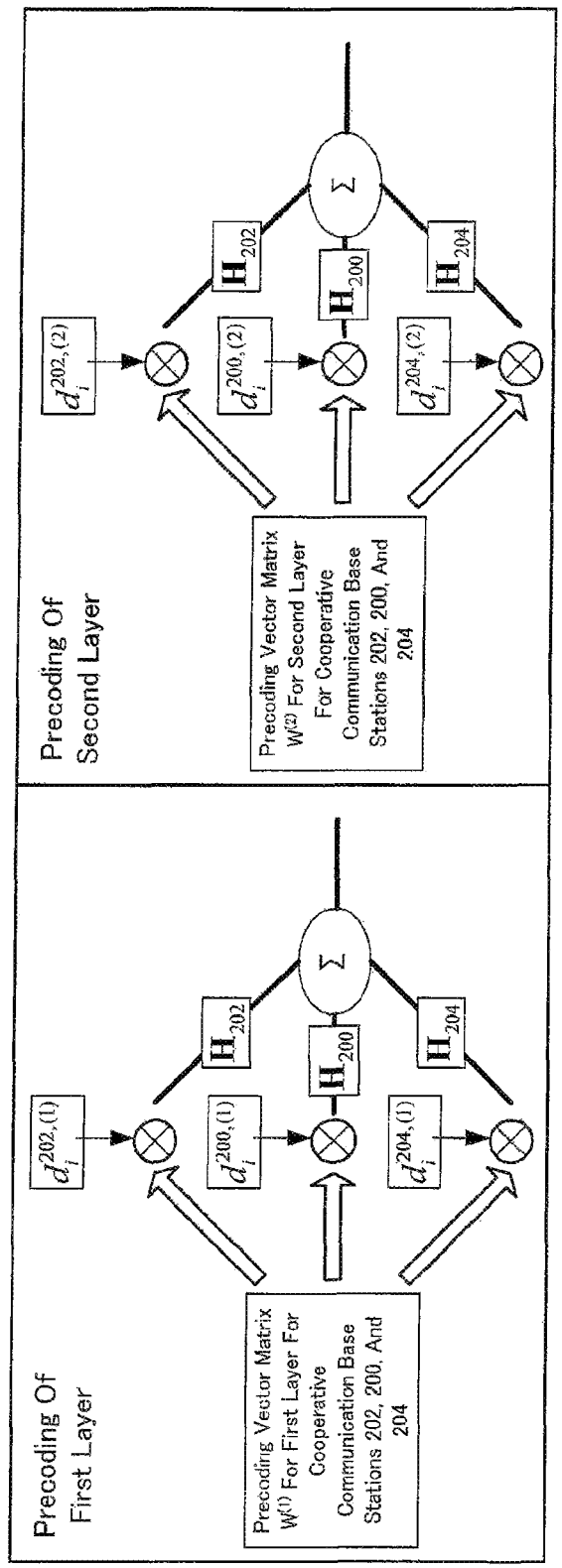
FIG. 8 is a diagram schematically illustrating an example case 2 in which the method of the present invention is employed by three cooperatively communicating base stations.

The user device receives signals which are obtained as a result of an operation in which the serving base station 202 and the cooperative communication base stations 200 and 204 perform an identical precoding process and additively combine results of each layer precoding process with one another. FIG. 8 illustrates how this operation is performed. Unlike in the example application of the case 1, this example application employs additive combining for each transmission layer. As such, each transmission layer is assigned its particular, independent weight vector $D_{i(l)}$. In precoding for a single layer, a precoding matrix can be divided into precoding vectors $w^{(l)}$. $w^{(l)}$ represents an l-th column vector for a precoding matrix W.

For the user device 416, matrices of channels extending from the serving base station 202 and the cooperative communication base station 200 and 203 to the user device 416 are each divided into a plurality of transmission layers so as to provide virtual channels for each layer through $D_{i(l)}$ additive combinations. Each layer is thus processed with use of an identical precoding vector $w^{(l)}$. This is expressed by a the following numerical formula:

$$y = \sum_{l=1}^{2} \left(\sqrt{P_{202}} H_{202} d_{i(l)}^{202,(l)} + \sqrt{P_{200}} H_{200} d_{i(l)}^{200,(l)} + \sqrt{P_{204}} H_{204} d_{i(l)}^{204,(l)}\right) w^{(l)} x^{(l)} + n$$

y: received signal $x^{(l)}$: transmission data n: noise $\sqrt{P_{202}}$, $\sqrt{P_{200}}$, $\sqrt{P_{204}}$: transmission electric power coefficients $w^{(l)}$: identical precoding vector employed by a serving base station and cooperative base stations (where l is a layer number; l=1, 2)

As such, virtual channels for each layer are expressed by the following numerical formula:

$$H_i^{(l)} = \sqrt{P_{202}}H_{202}d_{i(l)}^{202,(l)} + \sqrt{P_{200}}H_{200}d_{i(l)}^{200,(l)} + \sqrt{P_{204}}H_{204}d_{i(l)}^{204,(l)} \quad (i(l)=0,1,\ldots,7)$$

In a case where the user device 416 detects a combination of a precoding effect and an additive effect for each layer, the user device 416 can obtain an index number x(l) for a suitable weight vector $k_{x(l)}$ and an index number h for a suitable precoding matrix $W_h$ as shown in the following Formula (5):

$$(x(l), h) = \underset{\{x(l)|i(l)=0,1,\ldots,7\},\{h|j=0,1,\ldots,15\}}{\arg\max} \left\{ \sum_{l=1}^{2} \left| \left( \sqrt{P_{202}} H_{202}d_{i(l)}^{202,(l)} + \ldots + \sqrt{P_{200}} H_{200}d_{i(l)}^{200,(l)} + \sqrt{P_{204}} H_{204}d_{i(l)}^{204,(l)} \right) w_h^{(l)} \right|^2 \right\} \quad (5)$$

In Formula (5), a sum of squares of a mode indicates, as an amount of electric power, a total electric power gain obtained after a precoding process for each layer with respect to $H_i^{(l)}$. The electric power gain can be expressed as a quantized value Q of channel quality as in the following Formula (6):

$$Q = \sum_{l=1}^{2} |H_x^{(l)} w_h^{(l)}|^2 \quad (6)$$

$$\tilde{Q} = quant\{Q\}$$

In Formula (6), "quant{·}" stands for a quantization process. A quantized value $\tilde{Q}$ of Q can alternatively be expressed as a quantized value of channel quality.

In the present embodiment, the estimation of channel information by a user device includes at least finding one precoding matrix index number h, one precoding weight vector index number x, and one quantized value $\tilde{Q}$ of channel quality.

In this example application, (i) the index numbers x(l) and h are obtained from Formula (5), (ii) the quantized value $\tilde{Q}$ of channel quality is obtained from Formula (6), and (iii) the precoding weight vector codebook $\{D_{i(l)}\}$ and the precoding matrix codebook $\{W_j\}$ are obtained. This is, however, merely an example which serves to illustrate feasibility of the present invention. In specific applications, the precoding weight vector codebook $\{D_{i(l)}\}$ and the precoding matrix codebook $\{W_j\}$ can each have a design other than the above example. Such design variation does not influence the feasibility of the present invention. The index number x(l), the index number h, and the quantized value $\tilde{Q}$ of channel quality can alternatively be obtained by another method.

[Example Application (a) in Case 3]

Suppose that (i) the user device 416 is provided with two receive antennas, (ii) the serving base station for the user device 416 is the base station 202, and the cooperative communication base stations for the user device 416 are the base stations 200 and 204. The base stations 200 and 204 are each provided with four transmit antennas, whereas the base station 204 is provided with two transmit antennas. Suppose also that (i) $H_{202}$ represents a matrix of channels (2×4 matrix; a first dimension of the channel matrix corresponds to the number of receive antennas, and a second dimension of the channel matrix corresponds to the number of transmit antennas) from the serving base station 202 to the user device 416, (ii) $H_{200}$ represents a matrix of channels (2×4 matrix) from the cooperative communication base station 200 to the user device 416, and (iii) $H_{204}$ represents a matrix of channels (2×2 matrix) from the cooperative communication base station 204 to the user device 416. In a case where (i) the base stations 200, 202, and 204 all employ closed-loop space-division multiplexing and (ii) the number of transmission layers is two, the precoding matrices of the base stations 200 and 202 is 4×2 in dimension (where the first dimension of the precoding matrix represents the number of transmit antennas, and the second dimension of the precoding matrix represents the number of transmission layers), whereas the precoding matrix of the base station 204 is 2×2 in dimension. According to a description on pages 51 and 52 of the 3GPP organization's document TS 36.211 V8.3.0, "Evolved Universal Terrestrial Radio Access (E-UTRA); Physical Channels and Modulation," a codebook of the precoding matrices of the respective base stations 200 and 202 contains a total of 16 code words, which are set as $W_0$, $W_1$, ..., $W_{15}$. Further, a codebook for the precoding matrix of the base station 204 contains a total of 4 code words, which are set as $U_0$, $U_1$, ..., $U_3$.

The codebook for the precoding matrix of the base station 204 is different from the codebook for the precoding matrices of the respective base stations 200 and 202. As such, a kind of mapping is defined so that as shown in Table 2 below, the codebook for the precoding matrix of the base station 204 and the codebook for the precoding matrices of the respective base stations 200 and 202 are theoretically identical. The above codebooks are mapped as shown in the following Table 2:

TABLE 2

Theoretical Mapping of Codebooks

| Code words in original codebook | $U_0$ | $U_1$ | $U_2$ | $U_3$ | $U_0$ | $U_1$ | $U_2$ | $U_3$ |
|---|---|---|---|---|---|---|---|---|
| Code words in mapped codebook | $W_0$ | $W_1$ | $W_2$ | $W_3$ | $W_4$ | $W_5$ | $W_6$ | $W_7$ |
| Code words in original codebook | $U_0$ | $U_1$ | $U_2$ | $U_3$ | $U_0$ | $U_1$ | $U_2$ | $U_3$ |
| Code words in mapped codebook | $W_8$ | $W_9$ | $W_{10}$ | $W_{11}$ | $W_{12}$ | $W_{13}$ | $W_{14}$ | $W_{15}$ |

The codebook mapping shown in Table 2 serves as an example to illustrate feasibility of the present invention. The present invention can thus be performed with use of word book mapping other than the above example. The word book mapping is in practice performed so as to prevent an unnecessary increase in amount of feedback information by making theoretically identical the word book mapping between the serving base station and the cooperative communication base stations.

The serving base station 202 and the cooperative communication base stations 200 and 204 employ an identical precoding matrix so as to weight transmission signals and then transmit them. The weighting stands for an operation in which the serving base station 202 and the cooperative communication base stations 200 and 204 multiply results of each layer precoding process by a weight vector $D_{i(l)}$ (where l is an index number for a transmission data transmission layer; l=1, 2). Since the three base stations cooperate with one another, the weight vector for layer precoding for an l-th layer is expressed as $D_{i(l)} = [d_{i(l)}^{202}, d_{i(l)}^{200}, d_{i(l)}^{204}]$, where $d_{i(l)}^{202}$, $d_{i(l)}^{200}$, $d_{i(l)}^{204}$ represent respective weight values for results of precoding an l-th layer of each of the base stations 202, 200, and 204. The codebook shown in Table 1 above of weight vectors for layer precoding, which codebook is an example of precoding in accordance with the present embodiment, shows eight code words to select from, and thus indicates that i=0, 1, ..., 7.

Code word $D_{0(l)}$:

[1, exp($-j\phi_0$), exp($-j2\phi_0$)] ($\phi_0=0$)

Code word $D_{1(l)}$:

[1, exp($-j\phi_1$), exp($-j2\phi_1$)] ($\phi_1=2\pi(1/8)=\pi/4$)

Code word $D_{2(l)}$:

[1, exp($-j\phi_2$), exp($-j2\phi_2$)] ($\phi_2=2\pi(2/8)=\pi/2$)

Code word $D_{3(l)}$:

[1, exp($-j\phi_3$), exp($-j2\phi_3$)] ($\phi_3=2\pi(3/8)=3\pi/4$)

Code word $D_{4(l)}$:

[1, exp($-j\phi_4$), exp($-j2\phi_4$)] ($\phi_4=2\pi(4/8)=\pi$)

Code word $D_{5(l)}$:

[1, exp($-j\phi_5$), exp($-j2\phi_5$)] ($\phi_5=2\pi(5/8)=5\pi/4$)

Code word $D_{6(l)}$:

[1, exp($-j\phi_6$, exp($-j2\phi_6$)] ($\phi_6=2\pi(6/8)=3\pi/2$)

Code word $D_{7(l)}$:

[1, exp($-j\phi_7$), exp($-j2\phi_7$)] ($\phi_7=2\pi(7/8)=7\pi/4$)

The user device receives signals which are obtained as a result of an operation in which the serving base station 202 and the cooperative communication base stations 200 and 204 perform an identical precoding process and additively combine results of each layer precoding process with one another. FIG. 8 illustrates how this operation is performed. Unlike in the example application of the case 1, this example application employs additive combining for each transmission layer. As such, each layer is assigned its particular, independent weight vector $D_{i(l)}$. In precoding for a single layer, a precoding matrix can be divided into precoding vectors $w^{(l)}$. $w^{(l)}$ represents an l-th column vector for a precoding matrix W.

For the user device, matrices of channels extending from the serving base station 202 and the cooperative communication base station 200 and 203 to the user device are each divided into a plurality of transmission layers so as to provide virtual channels for each layer through $D_{i(l)}$ additive combinations. Each layer is thus processed with use of an identical precoding vector $w^{(l)}$. This is expressed by a numerical formula as follows:

$$y = \sum_{l=1}^{2} (\sqrt{P_{202}} H_{202} d_{i(l)}^{202,(l)} + \sqrt{P_{200}} H_{200} d_{i(l)}^{200,(l)} + \sqrt{P_{204}} H_{204} d_{i(l)}^{204,(l)}) w^{(l)} x^{(l)} + n$$

y: received signal
$x^{(l)}$: transmission data
n: noise
$\sqrt{P_{202}}, \sqrt{P_{200}}, \sqrt{P_{204}}$: transmission electric power coefficients
$w^{(l)}$: identical precoding vector employed by a serving base station and cooperative base stations (where l is a layer number; l=1, 2)

Since $H_{204}$ is different from $H_{200}$ and $H_{202}$ in dimension, it is impossible to express virtual channels of each layer by a numerical formula. However, in a case where the user device 416 detects a combination of a precoding effect and an additive effect for each layer, the user device 416 can obtain an index number x(l) for a suitable weight vector $D_{x(l)}$ and an index number h for a suitable precoding matrix $W_h$ as shown in the following Formula (7):

$$(x(l), h) = \underset{\{x(l)|l(l)=0,1,\ldots,7\}\{h|j=0,1,\ldots,15\}}{\arg\max} \left\{ \sum_{l=1}^{2} |(\sqrt{P_{202}} H_{202} d_{i(l)}^{202,(l)} + \ldots + \sqrt{P_{200}} H_{200} d_{i(l)}^{200,(l)} + \sqrt{P_{204}} H_{204} d_{i(l)}^{204,(l)}) w_h^{(l)}|^2 \right\} \quad (7)$$

In Formula (7), a sum of squares of a mode indicates, as an amount of electric power, a total electric power gain obtained after a precoding process for each layer with respect to $H_i^{(l)}$. The electric power gain can be expressed as a quantized value Q of channel quality as in the following Formula (8):

$$Q = \sum_{l=1}^{2} |H_x^{(l)} w_h^{(l)}|^2 \quad (8)$$

$$\tilde{Q} = quant\{Q\}$$

In Formula (8), "quant$\{\cdot\}$" stands for a quantization process. A quantized value $\tilde{Q}$ of Q can alternatively be expressed as a quantized value of channel quality.

In the present embodiment, the estimation of channel information by a user device includes at least finding one precoding matrix index number h, one precoding weight vector index number x, and one quantized value $\tilde{Q}$ of channel quality.

In this example application, (i) the index numbers x(l) and h are obtained from Formula (7), (ii) the quantized value $\tilde{Q}$ of channel quality is obtained from Formula (8), and (iii) the precoding weight vector codebook $\{D_{i(l)}\}$ and the precoding matrix codebook $\{W_j\}$ are obtained. This is, however, merely an example which serves to illustrate feasibility of the present invention. In specific applications, the precoding weight vector codebook $\{D_{i(l)}\}$ and the precoding matrix codebook $\{W_j\}$ can each have a design other than the above example. Such design variation does not influence the feasibility of the present invention. The index number x(l), the index number h, and the quantized value $\tilde{Q}$ of channel quality can alternatively be obtained by another method.

[Example Application (b) in Case 3]

Suppose that (i) the user device 416 is provided with two receive antennas, (ii) the serving base station for the user device 416 is the base station 202, and the cooperative communication base stations for the user device 416 are the base stations 200 and 204. The base stations 200 and 204 are each provided with four transmit antennas, whereas the base station 204 is provided with two transmit antennas. Suppose also that (i) $H_{202}$ represents a matrix of channels (2×4 matrix; a first dimension of the channel matrix corresponds to the number of receive antennas, and a second dimension of the channel matrix corresponds to the number of transmit antennas) from the serving base station 202 to the user device 416, (ii) $H_{200}$ represents a matrix of channels (2×4 matrix) from the cooperative communication base station 200 to the user device 416, and (iii) $H_{204}$ represents a matrix of channels (2×2 matrix) from the cooperative communication base station 204 to the user device 416. In a case where (i) the base stations 200, 202, and 204 all employ closed-loop space-division multiplexing and (ii) the number of transmission layers is two, the precoding matrices of the base stations 200 and 202 is 4×2 in dimension (where the first dimension of the precoding matrix represents the number of transmit antennas, and the second dimension of the precoding matrix represents the number of transmission layers), whereas the precoding matrix of the base station 204 is 2×2 in dimension. According to a description on pages 51 and 52 of the 3GPP organization's document TS 36.211 V8.3.0, "Evolved Universal Terrestrial Radio Access (E-UTRA); Physical Channels and Modulation," a codebook of the precoding matrices of the respective base stations 200 and 202 contains a total of 16 code words, which are set as $W_0, W_1, \ldots, W_{15}$. Further, a codebook for the precoding matrix of the base station 204 contains a total of 4 code words, which are set as $U_0, U_1, \ldots, U_3$.

The codebook for the precoding matrix of the base station 204 is different from the codebook for the precoding matrices of the respective base stations 200 and 202. As such, a low-dimensional codebook contains truncated codewords from a high-dimensional codebook so that the codebook for the precoding matrix of the base station 204 and the codebook for the precoding matrices of the respective base stations 200 and 202 are theoretically identical. The above division is shown in the following Table 3:

TABLE 3

Codebook Division

| Code words in high-dimensional codebook | $W_0$ | $W_1$ | $W_2$ | $W_3$ | $W_4$ | $W_5$ | $W_6$ | $W_7$ |
| --- | --- | --- | --- | --- | --- | --- | --- | --- |
| Code words in truncated codebook | $W_0^{tx}$ | $W_1^{tx}$ | $W_2^{tx}$ | $W_3^{tx}$ | $W_4^{tx}$ | $W_5^{tx}$ | $W_6^{tx}$ | $W_7^{tx}$ |
| Code words in high-dimensional codebook | $W_8$ | $W_9$ | $W_{10}$ | $W_{11}$ | $W_{12}$ | $W_{13}$ | $W_{14}$ | $W_{15}$ |
| Code words in high-dimensional codebook | $W_8^{tx}$ | $W_9^{tx}$ | $W_{10}^{tx}$ | $W_{11}^{tx}$ | $W_{12}^{tx}$ | $W_{13}^{tx}$ | $W_{14}^{tx}$ | $W_{15}^{tx}$ |

In Table 3, tx represents the number of transmit antennas at a base station corresponding to a low-dimensional codebook, and $W_i^{tx}$ represents a code word on a first row tx obtained by dividing $W_i$. In this example application, the base station corresponding to a low-dimensional codebook is the base station 204, which is provided with two transmit antennas. The precoding codebook for the base station 204 originally contains only four code words. However, truncating a high-dimensional codebook allows the precoding codebook for the base station 204 to contain 16 code words. The codebook division shown in Table 3 is naturally a mere example to illustrate feasibility of the present invention. The present invention can thus be performed with use of word book division other than the above example. The word book division is in practice performed so as to prevent an unnecessary increase in amount of feedback information by making theoretically identical the word book of the precoding matrices between the serving base station and the cooperative communication base stations.

The serving base station 202 and the cooperative communication base stations 200 and 204 employ an identical precoding matrix so as to weight transmission signals and then transmit them. The weighting stands for an operation in which the serving base station 202 and the cooperative communication base stations 200 and 204 multiply results of each layer precoding process by a weight vector $D_{i(l)}$ (where l is an index number for a transmission data transmission layer; l=1, 2). Since the three base stations cooperate with one another, the weight vector for layer precoding for an l-th layer is expressed as $D_{i(l)} = [d_{i(l)}^{202}, d_{i(l)}^{200}, d_{i(l)}^{204}]$, where $d_{i(l)}^{202}$, $d_{i(l)}^{200}$, $d_{i(l)}^{204}$ represent respective weight values for results of precoding an l-th layer of each of the base stations 202, 200, and 204. The codebook shown in Table 1 above of weight vectors for layer precoding, which codebook is an example of precoding in accordance with the present embodiment, shows eight code words to select from, and thus indicates that i=0, 1, ..., 7.

Code word $D_{0(l)}$:

[1, exp($-j\phi_0$), exp($-j2\phi_0$)] ($\phi_0=0$)

Code word $D_{i(l)}$:

[1, exp($-j\phi_1$), exp($-j2\phi_1$)] ($\phi_1=2\pi(1/8)=\pi/4$)

Code word $D_{2(l)}$:

[1, exp($-j\phi_2$), exp($-j2\phi_2$)] ($\phi_2=2\pi(2/8)=\pi/2$)

Code word $D_{3(l)}$:

[1, exp($-j\phi_3$), exp($-j2\phi_3$)] ($\phi_3=2\pi(3/8)=3\pi/4$)

Code word $D_{4(l)}$:

[1, exp($-j\phi_4$), exp($-j2\phi_4$)] ($\phi_4=2\pi(4/8)=\pi$)

Code word $D_{5(l)}$:

[1, exp($-j\phi_5$), exp($-j2\phi_5$)] ($\phi_5=2\pi(5/8)=5\pi/4$)

Code word $D_{6(l)}$:

[1, exp($-j\phi_6$), exp($-j2\phi_6$)] ($\phi_6=2\pi(6/8)=3\pi/2$)

Code word $D_{7(l)}$:

[1, exp($-j\phi_7$), exp($-j2\phi_7$)] ($\phi_7=2\pi(7/8)=7\pi/4$)

The user device 416 receives signals which are obtained as a result of an operation in which the serving base station 202 and the cooperative communication base stations 200 and 204 perform an identical precoding process and additively combine results of each layer precoding process with one another. FIG. 8 illustrates how this operation is performed. Unlike in the example application of the case 1, this example application employs additive combining for each transmission layer. As such, each layer is assigned its particular, independent weight vector $D_{i(l)}$. In precoding for a single layer, a precoding matrix can be divided into precoding vectors $w^{(l)}$. $w^{(l)}$ represents an l-th column vector for a precoding matrix W.

For the user device, matrices of channels extending from the serving base station 202 and the cooperative communication base station 200 and 203 to the user device are each divided into a plurality of transmission layers so as to provide virtual channels for each layer through $D_{i(l)}$ additive combinations. Each layer is thus processed with use of an identical precoding vector $w^{(l)}$. This is expressed by a numerical formula as follows:

$$y = \sum_{l=1}^{2} \left( \sqrt{P_{202}} H_{202} d_{i(l)}^{202,(l)} + \sqrt{P_{200}} H_{200} d_{i(l)}^{200,(l)} + \sqrt{P_{204}} H_{204} d_{i(l)}^{204,(l)} \right) w^{(l)} x^{(l)} + n$$

y: received signal
$x^{(l)}$: transmission data
n: noise
$\sqrt{P_{202}}, \sqrt{P_{200}}, \sqrt{P_{204}}$: transmission electric power coefficients
$w^{(l)}$: identical precoding vector employed by a serving base station and cooperative base stations (where l is a layer number; l=1, 2)

Since $H_{204}$ is different from $H_{200}$ and $H_{202}$ in dimension, virtual channels of each layer cannot be expressed by a numerical formula. However, in a case where the user device 416 detects a combination of a precoding effect and an additive effect for each layer, the user device 416 can obtain an index number x(l) for a suitable weight vector $D_{x(l)}$ and an index number h for a suitable precoding matrix $W_h$ as shown in the following Formula (9):

$$(x(l), h) = \underset{\{x(l)|i(l)=0,1,\ldots,7\}\{h|j=0,1,\ldots,15\}}{\arg\max} \left\{ \sum_{l=1}^{2} |(\sqrt{P_{202}} H_{202} d_{i(l)}^{202,(l)} + \ldots + \sqrt{P_{200}} H_{200} d_{i(l)}^{200,(l)} + \sqrt{P_{204}} H_{204} d_{i(l)}^{204,(l)}) w_h^{(l)}|^2 \right\} \quad (9)$$

In Formula (9), a sum of squares of a mode indicates, as an amount of electric power, a total electric power gain obtained after a precoding process for each layer with respect to $H_i^{(l)}$. The electric power gain can be expressed as a quantized value Q of channel quality as in the following Formula (10):

$$Q = \sum_{l=1}^{2} |H_x^{(l)} w_h^{(l)}|^2 \quad (10)$$

$$\tilde{Q} = quant\{Q\}$$

In Formula (10), "quant{·}" stands for a quantization process. A quantized value $\tilde{Q}$ of Q can alternatively be expressed as a quantized value of channel quality.

In the present embodiment, the estimation of channel information by a user device includes at least finding one precoding matrix index number h, one precoding weight vector index number x, and one quantized value $\tilde{Q}$ of channel quality.

In this example application, (i) the index numbers x(l) and h are obtained from Formula (9), (ii) the quantized value $\tilde{Q}$ of channel quality is obtained from Formula (10), and (iii) the precoding weight vector codebook $\{D_{i(l)}\}$ and the precoding matrix codebook $\{W_j\}$ are obtained. This is, however, merely an example which serves to illustrate feasibility of the present invention. In specific applications, the precoding weight vector codebook $\{D_{i(l)}\}$ and the precoding matrix codebook $\{W_j\}$ can each have a design other than the above example. Such design variation does not influence the feasibility of the present invention. The index number x(l), the index number h, and the quantized value $\tilde{Q}$ of channel quality can alternatively be obtained by another method.

[Example Application (a) in Case 4]

Suppose that (i) the user device 416 is provided with two receive antennas, (ii) the serving base station for the user device 416 is the base station 202, and the cooperative communication base stations for the user device 416 are the base stations 200 and 204. The base stations 200 and 204 are each provided with four transmit antennas, whereas the base station 204 is provided with two transmit antennas. Suppose also that (i) $H_{202}$ represents a matrix of channels (2×4 matrix; a first dimension of the channel matrix corresponds to the number of receive antennas, and a second dimension of the channel matrix corresponds to the number of transmit antennas) from the serving base station 202 to the user device 416, (ii) $H_{200}$ represents a matrix of channels (2×4 matrix) from the cooperative communication base station 200 to the user device 416, and (iii) $H_{204}$ represents a matrix of channels (2×2 matrix) from the cooperative communication base station 204 to the user device 416. In a case where (i) the base stations 200, 202, and 204 all employ closed-loop space-division multiplexing and (ii) the number of transmission layers is two, the precoding matrices of the base stations 200 and 202 is 4×2 in dimension (where the first dimension of the precoding matrix represents the number of transmit antennas, and the second dimension of the precoding matrix represents the number of transmission layers), whereas the precoding matrix of the base station 204 is 2×2 in dimension. According to a description on pages 51 and 52 of the 3GPP organization's document TS 36.211 V8.3.0, "Evolved Universal Terrestrial Radio Access (E-UTRA); Physical Channels and Modulation," a codebook of the precoding matrices of the respective base stations 200 and 202 contains a total of 16 code words, which are set as $W_0, W_1, \ldots, W_{15}$. Further, a codebook for the precoding matrix of the base station 204 contains a total of 4 code words, which are set as $U_0, U_1, \ldots, U_3$.

The codebook for the precoding matrix of the base station 204 is different from the codebook for the precoding matrices of the respective base stations 200 and 202. As such, a kind of mapping is defined so that as shown in Table 2 above, the codebook for the precoding matrix of the base station 204 and the codebook for the precoding matrices of the respective base stations 200 and 202 are theoretically identical. The above codebooks are mapped as shown in the above Table 2.

The codebook mapping shown in Table 2 serves as an example to illustrate feasibility of the present invention. The present invention can thus be performed with use of word book mapping other than the above example. The word book mapping is in practice performed so as to prevent an unnecessary increase in amount of feedback information by making theoretically identical the word book mapping between the serving base station and the cooperative communication base stations.

The serving base station 202 and the cooperative communication base stations 200 and 204 employ a theoretically identical precoding matrix so as to weight transmission signals and then transmit them. The weighting stands for an operation in which the serving base station 202 and the cooperative communication base stations 200 and 204 multiply results of overall precoding by a weight vector $D_i$. Since the three base stations cooperate with one another, the weight vector for precoding is expressed as $D_i = [d_i^{202}, d_i^{200}, d_i^{204}]$, where $d_i^{202}, d_i^{200}, d_i^{204}$ represent weight values for the base stations 202, 200, and 204, respectively. The codebook shown in Table 1 above of weight vectors for overall precoding, which codebook is an example of precoding in accordance with the present embodiment, shows eight code words to select from, and thus indicates that i=0, 1, . . . , 7.

Code word $D_0$:

[1, exp($-j\phi_0$), exp($-j2\phi_0$)] ($\phi_0 = 0$)

Code word $D_1$:

[1, exp($-j\phi_1$), exp($-j2\phi_1$)] ($\phi_1 = 2\pi(1/8) = \pi/4$)

Code word $D_2$:

[1, exp($-j\phi_2$), exp($-j2\phi_2$)] ($\phi_2 = 2\pi(2/8) = \pi/2$)

Code word $D_3$:

$$[1, \exp(-j\phi_3), \exp(-j2\phi_3)] \quad (\phi_3=2\pi(\tfrac{3}{8})=3\pi/4)$$

Code word $D_4$:

$$[1, \exp(-j\phi_4), \exp(-j2\phi_4)] \quad (\phi_4=2\pi(\tfrac{4}{8})=\pi)$$

Code word $D_5$:

$$[1, \exp(-j\phi_5), \exp(-j2\phi_5)] \quad (\phi_5=2\pi(\tfrac{5}{8})=5\pi/4)$$

Code word $D_6$:

$$[1, \exp(-j\phi_6), \exp(-j2\phi_6)] \quad (\phi_6=2\pi(\tfrac{6}{8})=3\pi/2)$$

Code word $D_7$:

$$[1, \exp(-j\phi_7), \exp(-j2\phi_7)] \quad (\phi_7=2\pi(\tfrac{7}{8})=7\pi/4)$$

The user device 416 receives signals which are obtained as a result of an operation in which the serving base station 202 and the cooperative communication base stations 200 and 204 perform identical precoding and additively combine results of an overall precoding process with one another. FIG. 7 illustrates an example of how this operation is performed.

For the user device, the matrices of channels extending from the serving base station 202 and the cooperative communication base stations 200 and 204 to the user device provide virtual channels through $D_i$ additive combinations. Further, the virtual channels are matched with the identical precoding matrix W. This can be expressed by the following numerical formula:

$$y=(\sqrt{P_{202}}H_{202}d_i^{202}+\sqrt{P_{200}}H_{200}d_i^{200}+\sqrt{P_{204}}H_{204}d_i^{204})Wx+n$$

y: received signal
x: transmission data
n: noise
$\sqrt{P_{202}}, \sqrt{P_{200}}, \sqrt{P_{204}}$: transmission electric power coefficients
W: identical precoding matrix employed by a serving base station and cooperative base stations Since $H_{204}$ is different from $H_{200}$ and $H_{202}$ in dimension, virtual channels cannot be expressed by a numerical formula. However, in a case where the user device 416 detects a combination of a precoding effect and an additive effect, the user device 416 can obtain an index number x for a suitable weight vector $D_x$ and an index number h for a suitable precoding matrix $W_h$ as shown in the following Formula (11):

$$(x, h) = \mathop{\arg\max}_{\substack{x|i=0,1,\ldots,7|h|j=0,1,\ldots,15}} \quad \ldots \quad (11)$$

$$\left\{\left\|\left(\sqrt{P_{202}}H_{202}d_i^{202}+\sqrt{P_{200}}H_{200}d_i^{200}+\sqrt{P_{204}}H_{204}d_i^{204}\right)W_j\right\|^2\right\}$$

$$Q = \left\|\left(\sqrt{P_{202}}H_{202}d_x^{202}+\sqrt{P_{200}}H_{200}d_x^{200}+\sqrt{P_{204}}H_{204}d_x^{204}\right)W_h\right\|^2$$

$$\tilde{Q} = \text{quant}\{Q\}$$

In Formula (11), "$\|\cdot\|^2$" stands for a square of a mode in a matrix, and indicates an electric power gain obtained as an amount of electric power after a precoding process. The electric power gain can alternatively be expressed as an amount Q indicative of channel quality. Further, "quant$\{\cdot\}$" stands for a quantization process. A quantized value $\tilde{Q}$ of Q can alternatively be expressed as a quantized value of channel quality.

In Formula (11), $W_h$ corresponding to $H_{200}$ and $H_{202}$ is a 4×2 matrix, whereas $W_h$ corresponding to $H_{204}$ is a 2×2 matrix. Note that $H_{200}$, $H_{200}$, and $H_{204}$ each provide a 2×2 matrix after being multiplied by $W_h$. The addition in Formula (11) can thus be performed.

In the present embodiment, the estimation of channel information by a user device includes at least finding one precoding matrix index number h, one precoding weight vector index number x, and one quantized value $\tilde{Q}$ of channel quality.

In this example application, (i) the index numbers x and h and the quantized value $\tilde{Q}$ of channel quality are obtained from Formula (11) and (ii) the precoding weight vector codebook $\{D_i\}$ and the precoding matrix codebook $\{W_j\}$ are obtained. This is, however, merely an example which serves to illustrate feasibility of the present invention. In specific applications, the precoding weight vector codebook $\{D_i\}$ and the precoding matrix codebook $\{W_j\}$ can each have a design other than the above example. Such design variation does not influence the feasibility of the present invention. The index number x(l), the index number h, and the quantized value $\tilde{Q}$ of channel quality can alternatively be obtained by another method.

[Example Application (b) in Case 4]

Suppose that (i) the user device 416 is provided with two receive antennas, (ii) the serving base station for the user device 416 is the base station 202, and the cooperative communication base stations for the user device 416 are the base stations 200 and 204. The base stations 200 and 204 are each provided with four transmit antennas, whereas the base station 204 is provided with two transmit antennas. Suppose also that (i) $H_{202}$ represents a matrix of channels (2×4 matrix; a first dimension of the channel matrix corresponds to the number of receive antennas, and a second dimension of the channel matrix corresponds to the number of transmit antennas) from the serving base station 202 to the user device 416, (ii) $H_{200}$ represents a matrix of channels (2×4 matrix) from the cooperative communication base station 200 to the user device 416, and (iii) $H_{204}$ represents a matrix of channels (2×2 matrix) from the cooperative communication base station 204 to the user device 416. In a case where (i) the base stations 200, 202, and 204 all employ closed-loop space-division multiplexing and (ii) the number of transmission layers is two, the precoding matrices of the base stations 200 and 202 is 4×2 in dimension (where the first dimension of the precoding matrix represents the number of transmit antennas, and the second dimension of the precoding matrix represents the number of transmission layers), whereas the precoding matrix of the base station 204 is 2×2 in dimension. According to a description on pages 51 and 52 of the 3GPP organization's document TS 36.211 V8.3.0, "Evolved Universal Terrestrial Radio Access (E-UTRA); Physical Channels and Modulation," a codebook of the precoding matrices of the respective base stations 200 and 202 contains a total of 16 code words, which are set as $W_0, W_1, \ldots, W_{15}$. Further, a codebook for the precoding matrix of the base station 204 contains a total of 4 code words, which are set as $U_0, U_1, \ldots, U_3$.

The codebook for the precoding matrix of the base station 204 is different from the codebook for the precoding matrices of the respective base stations 200 and 202. As such, a high-dimensional codebook is truncated to define a low-dimensional codebook so that the codebook for the precoding matrix of the base station 204 and the codebook for the precoding matrices of the respective base stations 200 and 202 are theoretically identical. The above division is shown in the above Table 3. In Table 3, tx represents the number of transmit antennas at a base station corresponding to a low-dimensional codebook, and $W_i^{tx}$ represents a first row tx obtained by dividing $W_i$. In this example application, the base station corresponding to a low-dimensional codebook is the base station 204, which is provided with two transmit antennas. The precoding codebook of the base station 204 originally contains only four code words. However, truncating a high-dimensional codebook allows the precoding codebook of the base station 204 to contain 16 code words.

The codebook division shown in Table 3 is naturally a mere example to illustrate feasibility of the present invention. The present invention can thus be performed with use of word book division other than the above example. The word book division is in practice performed so as to prevent an unnecessary increase in amount of feedback information by making theoretically identical the word book of the precoding matrices between the serving base station and the cooperative communication base stations.

The serving base station 202 and the cooperative communication base stations 200 and 204 employ a theoretically identical precoding matrix so as to weight transmission signals and then transmit them. The weighting stands for an operation in which the serving base station 202 and the cooperative communication base stations 200 and 204 multiply results of overall precoding by a weight vector $D_i$. Since the three base stations cooperate with one another, the weight vector for precoding is expressed as $D_i = [d_i^{202}, d_i^{200}, d_i^{204}]$, where $d_i^{202}, d_i^{200}, d_i^{204}$ represent weight values for the base stations 202, 200, and 204, respectively. The codebook shown in Table 1 above of weight vectors for overall precoding, which codebook is an example of precoding in accordance with the present embodiment, shows eight code words to select from, and thus indicates that $i=0, 1, \ldots, 7$.

Code word $D_0$:

$[1, \exp(-j\phi_0), \exp(-j2\phi_0)]$ ($\phi_0=0$)

Code word $D_1$:

$[1, \exp(-j\phi_1), \exp(-j2\phi_1)]$ ($\phi_1=2\pi(1/8)=\pi/4$)

Code word $D_2$:

$[1, \exp(-j\phi_2), \exp(-j2\phi_2)]$ ($\phi_2=2\pi(2/8)=\pi/2$)

Code word $D_3$:

$[1, \exp(-j\phi_3), \exp(-j2\phi_3)]$ ($\phi_3=2\pi(3/8)=3\pi/4$)

Code word $D_4$:

$[1, \exp(-j\phi_4), \exp(-j2\phi_4)]$ ($\phi_4=2\pi(4/8)=\pi$)

Code word $D_5$:

$[1, \exp(-j\phi_5), \exp(-j2\phi_5)]$ ($\phi_5=2\pi(5/8)=5\pi/4$)

Code word $D_6$:

$[1, \exp(-j\phi_6), \exp(-j2\phi_6)]$ ($\phi_6=2\pi(6/8)=3\pi/2$)

Code word $D_7$:

$[1, \exp(-j\phi_7), \exp(-j2\phi_7)]$ ($\phi_7=2\pi(7/8)=7\pi/4$)

For the user device 416, the matrices of channels extending from the serving base station 202 and the cooperative communication base stations 200 and 204 to the user device provide virtual channels through $D_i$ additive combinations. Further, the virtual channels are matched with the identical precoding matrix W. This can be expressed by the following numerical formula:

The user device 416 receives signals which are obtained as a result of an operation in which the serving base station 202 and the cooperative communication base stations 200 and 204 perform identical precoding and additively combine results of an overall precoding process with one another. FIG. 7 illustrates an example of how this operation is performed.

$$y = (\sqrt{P_{202}} H_{202} d_i^{202} + \sqrt{P_{200}} H_{200} d_i^{200} + \sqrt{P_{204}} H_{204} d_i^{204}) Wx + n$$

y: received signal
x: transmission data
n: noise
$\sqrt{P_{202}}, \sqrt{P_{200}}, \sqrt{P_{204}}$: transmission electric power coefficients
W: identical precoding matrix employed by a serving base station and cooperative base stations Since $H_{204}$ is different from $H_{200}$ and $H_{202}$ in dimension, virtual channels cannot be expressed by a numerical formula. However, in a case where the user device 416 detects a combination of a precoding effect and an additive effect, the user device 416 can obtain an index number x for a suitable weight vector $D_x$ and an index number h for a suitable precoding matrix $W_h$ as shown in the following Formula (12):

$$(x, h) = \underset{\{x|i=0,1,\ldots,7\}\{h|j=0,1,\ldots,15\}}{\arg\max} \ldots \quad (12)$$

$$Q = \frac{\{\|(\sqrt{P_{202}} H_{202} d_i^{202} + \sqrt{P_{200}} H_{200} d_i^{200} + \sqrt{P_{204}} H_{204} d_i^{204}) W_j\|^2\}}{\|(\sqrt{P_{202}} H_{202} d_x^{202} + \sqrt{P_{200}} H_{200} d_x^{200} + \sqrt{P_{204}} H_{204} d_x^{204}) W_h\|^2}$$

$$\tilde{Q} = quant\{Q\}$$

In Formula (12), "$\|\cdot\|^2$" stands for a square of a mode in a matrix, and indicates an electric power gain obtained as an amount of electric power after a precoding process. The electric power gain can alternatively be expressed as an amount Q indicative of channel quality. Further, "quant$\{\cdot\}$" stands for a quantization process. A quantized value $\tilde{Q}$ of Q can alternatively be expressed as a quantized value of channel quality.

In Formula (12), $W_h$ corresponding to $H_{200}$ and $H_{202}$ is a 4×2 matrix, whereas $W_h$ corresponding to $H_{204}$ is a 2×2 matrix. Note that $H_{200}$, $H_{200}$, and $H_{204}$ each provide a 2×2 matrix after being multiplied by $W_h$. The addition in Formula (11) can thus be performed.

In the present embodiment, the estimation of channel information by a user device includes at least finding one precoding matrix index number h, one precoding weight vector index number x, and one quantized value $\tilde{Q}$ of channel quality.

In this example application, (i) the index numbers x and h and the quantized value $\tilde{Q}$ of channel quality are obtained from Formula (12) and (ii) the precoding weight vector codebook $\{D_i\}$ and the precoding matrix codebook $\{W_j\}$ are obtained. This is, however, merely an example which serves to illustrate feasibility of the present invention. In specific applications, the precoding weight vector codebook $\{D_i\}$ and the precoding matrix codebook $\{W_j\}$ can each have a design other than the above example. Such design variation does not influence the feasibility of the present invention. The index number x(l), the index number h, and the quantized value $\tilde{Q}$ of channel quality can alternatively be obtained by another method.

The example applications described above each merely serve, in accordance with the present invention, as an example of how a user device estimates channel state information. The present invention is thus not limited in form of implementation to the above example applications.

During the step 510, the user device feeds back channel state information which includes at least (i) precoding matrix information, (ii) weight vector information either for overall precoding or for layer precoding, and (iii) a quantized value of channel quality.

The user device preferably feeds back channel state information for the serving base station and each cooperative communication base station only to the serving base station.

Alternatively, the user device preferably feeds back channel state information for the serving base station and each cooperative communication base station to each of the serving base station and the cooperative communication base stations.

In the present embodiment, the step 510 is described with reference to four example applications below.

[Example Application in Case 1]

Figure 9:
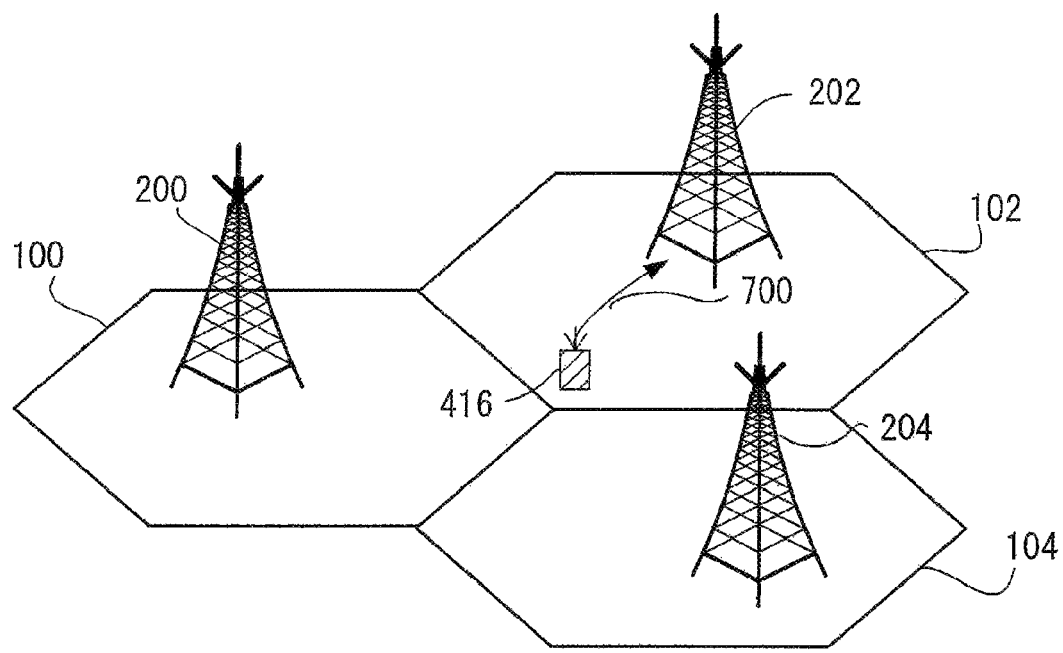
FIG. 9 is a diagram schematically illustrating how a user device feeds back information in the example case 1.

The serving base station for the user device 416 is the base station 202, whereas the cooperative communication base stations for the user device 416 are the base stations 200 and 204. The serving base station and the cooperative communication base stations for the user device 416 employ an identical downlink data transmission method, specifically, closed-loop space-division multiplexing. As illustrated in FIG. 9, the user device 416 feeds back downlink channel state information for the serving base station and the cooperative communication base stations only to the serving base station. In FIG. 9, the user device 416 feeds back, only to the serving base station 202 as the channel state information, at least (i) one precoding matrix index number, (ii) one precoding weight vector index number, and (iii) one quantized value of channel quality (as indicated in FIG. 9 by a feedback process 700).

[Example Application in Case 2]

Figure 10:
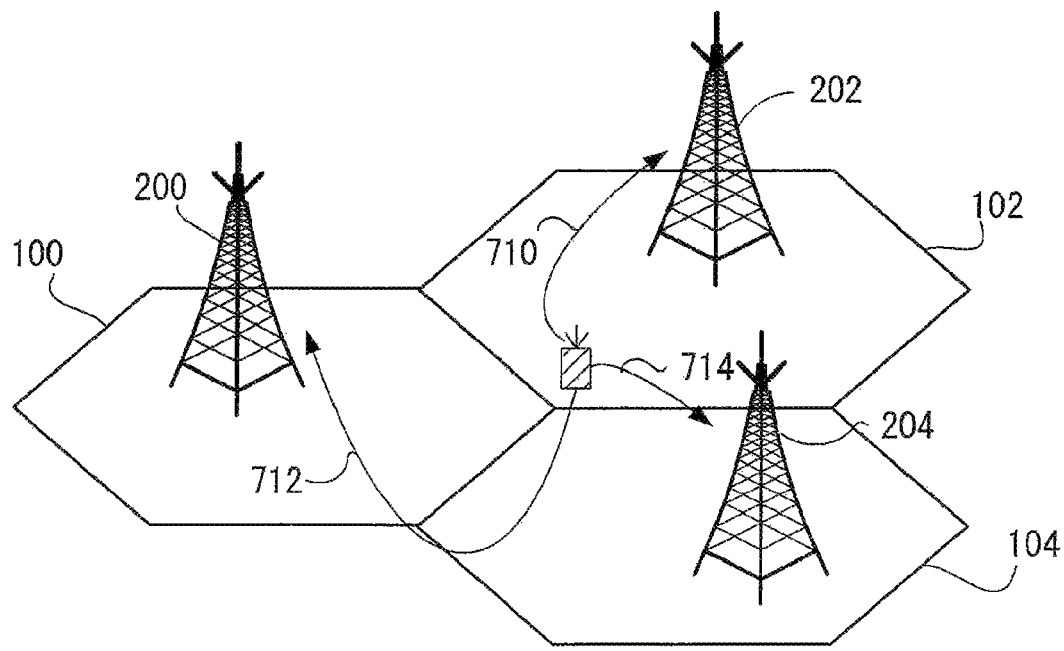
FIG. 10 is a diagram schematically illustrating how a user device feeds back information in the example case 2.

The serving base station for the user device 416 is the base station 202, whereas the cooperative communication base stations for the user device 416 are the base stations 200 and 204. The serving base station and the cooperative communication base stations for the user device 416 employ an identical downlink data transmission method, specifically, closed-loop space-division multiplexing. As illustrated in FIG. 10, the user device 416 feeds back downlink channel state information for the serving base station and each cooperative communication base station to each of the serving base station and the cooperative communication base stations. In FIG. 10, the user device 416 feeds back, to each of the serving base station 202 and the cooperative communication base stations 200 and 204 as the channel state information, at least (i) one precoding matrix index number and (ii) two layer precoding weight vector index numbers (as indicated in FIG. 10 by respective feedback processes 710, 712, and 714).

[Example Application in Case 3]

The serving base station for the user device 416 is the base station 202, whereas the cooperative communication base stations for the user device 416 are the base stations 200 and 204. The serving base station and the cooperative communication base stations for the user device 416 employ an identical downlink data transmission method, specifically, closed-loop space-division multiplexing. As illustrated in FIG. 9, the user device 416 feeds back downlink channel state information for the serving base station and the cooperative communication base stations only to the serving base station. In FIG. 9, the user device 416 feeds back, only to the serving base station 202 as the channel state information, at least (i) one precoding matrix index number, (ii) two layer precoding weight vector index numbers, and (iii) one quantized value of channel quality (as indicated in FIG. 9 by a feedback process 700).

[Example Application in Case 4]

The serving base station for the user device 416 is the base station 202, whereas the cooperative communication base stations for the user device 416 are the base stations 200 and 204. The serving base station and the cooperative communication base stations for the user device 416 employ an identical downlink data transmission method, specifically, closed-loop space-division multiplexing. As illustrated in FIG. 10, the user device 416 feeds back downlink channel state information for the serving base station and each cooperative communication base station to each of the serving base station and the cooperative communication base stations. In FIG. 10, the user device 416 feeds back, as the channel state information, at least (i) one precoding matrix index number and (ii) one precoding weight vector index number to each of the serving base station 202 and the cooperative communication base stations 200 and 204 (as indicated in FIG. 10 by respective feedback processes 710, 712, and 714).

The above examples each merely serve to illustrate, in accordance with the present invention, how a user device feeds back channel state information. The present invention is naturally not limited to the above examples in terms of how a user device feeds back channel state information.

During the step 515, the serving base station (i) obtains channel state information about downlink channels from the serving base station and cooperative communication base stations to the user device, (ii) performs resource scheduling according to the quantized value of channel quality (for example, selects a channel whose quantized value of channel quality is large), and (iii) transmits, to the cooperative communication base stations by a background communication, a result of resource scheduling, communication data, the precoding matrix information, and the weight vector information for precoding. Then, later during the step 515, the serving base station and the cooperative communication base stations simultaneously transmit downlink data signals to the user device.

For example, the serving base station obtains downlink channel state information on the basis of the feedback from the user device, and then performs resource scheduling. The serving base station next transmits a result of the resource scheduling and downlink communication data to each of the cooperative communication base stations. In another example, downlink communication data can be transmitted, instead of by the serving base station, through an upper layer directly to each of the cooperative communication base stations and the serving base station. Alternatively, the serving base station can transmit, to each cooperative communication base station, precoding matrix information and precoding weight vector information both determined from the downlink channel state information for the serving base station and the cooperative communication base stations.

According to the embodiment of the present invention, in a case where the serving base station and the cooperative communication base stations simultaneously transmit downlink data to the user device, the serving base station and the cooperative communication base stations perform scrambling with respect to communication data on the basis of an identical cell scrambling sequence.

The identical cell scrambling sequence is, for example, a cell scrambling sequence of the serving base station.

The cell scrambling serves as data encryption so that an unintended user device will not receive the communication data by mistake. The 3GPP organization's document TS 36.211 V8.3.0, "Evolved Universal Terrestrial Radio Access (E-UTRA); Physical Channels and Modulation" defines on page 45 the cell scrambling sequence. The cell scrambling sequence is related to a cell number and a user device number.

In the present embodiment, the step 515 is described with reference to two example applications below.

[Example Application in Case 1]

The serving base station for the user device 416 is the base station 202, whereas the cooperative communication base stations for the user device 416 are the base stations 200 and 204. The serving base station and the cooperative communication base stations for the user device 416 employ an identical downlink data transmission method, specifically, closed-loop space-division multiplexing. The cooperative communication base stations 200 and 204, when transmitting downlink data signals, employ a scrambling sequence S202 for the serving base station 202 so as to reduce complexity of a signal receiving process.

[Example Application in Case 2]

The serving base station for the user device 416 is the base station 202, whereas the cooperative communication base stations for the user device 416 are the base stations 200 and 204. The serving base station and the cooperative communication base stations for the user device 416 employ an identical downlink data transmission method, specifically, closed-loop space-division multiplexing. The serving base station 202 and the cooperative communication base stations 200 and 204, when transmitting downlink data signals, employ an identical scrambling sequence $S_x$ so as to reduce complexity of a signal receiving process.

The above examples each merely serve to illustrate, in accordance with the present invention, how the serving base station and the cooperative communication base stations simultaneously transmit downlink data signals to the user device. The present invention is naturally not limited to the above examples in terms of how the serving base station and the cooperative communication base stations simultaneously transmit downlink data signals to the user device.

The above description deals with the present invention on the basis of a specific embodiment (or example applications). The embodiment (or example applications), however, merely serves to illustrate the technical aspect of the present invention. The present invention thus should not be narrowly interpreted within the limits of the embodiment, but rather may be varied in many ways within the scope of the claims. Any embodiment based on a proper combination of technical means altered as appropriate within the scope of the claims is encompassed in the technical scope of the present invention.

INDUSTRIAL APPLICABILITY

The present invention is suitably applicable to a wireless communications system in which a cooperative communication is performed between multiple multi-antenna base stations.

REFERENCE SIGNS LIST

100, 102, 104 cell
200, 204 cooperative communication base station
202 serving base station
300, 302, 304 interface
400-430 user device (mobile station)

The invention claimed is:

1. A user device that is configured to and/or programmed to communicate with a base station device including a first multi antenna and a second multi antenna, the user device comprising:
   a transmitter; and
   a receiver, wherein:
   the user device is configured to and/or programmed to communicate with the base station device using a plurality of transmission layers;
   the transmitter is configured to and/or programmed to feedback a first precoding index number and a second precoding index number to the base station device;
   the receiver is configured to and/or programmed to receive, from the base station device, a transmission signal multiplied by a first precoding matrix; and
   the first precoding matrix is based on at least (i) a second precoding matrix applied identically to both a transmission signal of the first multi antenna and a transmission signal of the second multi antenna, and (ii) a weight coefficient value applied identically to each of the plurality of transmission layers of the transmission signal of the second multi antenna, wherein
   the weight coefficient value is a phase adjusting amount of the transmission signal of the second multi antenna, which equals to $\exp(-j\phi)$,
   the second precoding matrix is indicated by at least the first precoding index number, and
   a value of the $\phi$ is indicated by at least the second precoding index number.

2. The user device as set forth in claim 1, wherein:
   a total number of antennas used to transmit the transmission signal is 4 or 8;
   a number of antennas of the first multi antenna and a number of antennas of the second multi antenna are same with each other; and
   the plurality of transmission layers are two layers.

3. The user device as set forth in claim 1, wherein the plurality of transmission layers are two transmission layers.

4. A base station device that is configured to and/or programmed to communicate with a user device, the base station device comprising:
   a first multi antenna;
   a second multi antenna;
   a receiver; and
   a transmitter, wherein:
   the base station device is configured to and/or programmed to communicate with the user device using a plurality of transmission layers;
   the receiver is configured to and/or programmed to receive, from the user device, a first precoding index number and a second precoding index number;
   the transmitter is configured to and/or programmed to transmit, to the user device, a transmission signal multiplied by a first precoding matrix; and
   the first precoding matrix is based on at least (i) a second precoding matrix applied identically to both a transmission signal of the first multi antenna and a transmission signal of the second multi antenna, and (ii) a weight coefficient value applied identically to each of the plurality of transmission layers of the transmission signal of the second multi antenna, wherein
   the weight coefficient value is a phase adjusting amount of the transmission signal of the second multi antenna, which equals to $\exp(-j\phi)$,
   the second precoding matrix is indicated by at least the first precoding index number, and
   a value of the $\phi$ is indicated by at least the second precoding index number.

5. The base station device as set forth in claim 4, wherein:
   a total number of antennas used to transmit the transmission signal is 4 or 8;
   a number of antennas of the first multi antenna and a number of antennas of the second multi antenna are same with each other; and
   the plurality of transmission layers are two layers.

6. The base station device as set forth in claim 4, wherein the plurality of transmission layers are two transmission layers.

7. A communication method of a user device that is configured to and/or programmed to communicate with a base station device, using a plurality of transmission layers, the base station device including a first multi antenna and a second multi antenna, the communication method comprising:

feeding back a first precoding index number and a second precoding index number to the base station device, receiving, from the base station device, a transmission signal multiplied by a first precoding matrix, wherein the first precoding matrix is based on at least (i) a second precoding matrix applied identically to both a transmission signal of the first multi antenna and a transmission signal of the second multi antenna, and (ii) a weight coefficient value applied identically to each of the plurality of transmission layers of the transmission signal of the second multi antenna, wherein the weight coefficient value is a phase adjusting amount of the transmission signal of the second multi antenna, which equals to $\exp(-j\phi)$, the second precoding matrix is indicated by at least the first precoding index number, and a value of the $\phi$ is indicated by at least the second precoding index number.

8. The communication method as set forth in claim 7, wherein the plurality of transmission layers are two transmission layers.

9. A communication method of a base station device that is configured to and/or programmed to communicate with a user device, using a plurality of transmission layers, the base station device including a first multi antenna and a second multi antenna, the communication method comprising:

receiving a first precoding index number and a second precoding index number from the user device, transmitting, to the user device, a transmission signal multiplied by a first precoding matrix, wherein the first precoding matrix is based on at least (i) a second precoding matrix applied identically to both a transmission signal of the first multi antenna and a transmission signal of the second multi antenna, and (ii) a weight coefficient value applied identically to each of the plurality of transmission layers of the transmission signal of the second multi antenna, wherein the weight coefficient value is a phase adjusting amount of the transmission signal of the second multi antenna, which equals to $\exp(-j\phi)$, the second precoding matrix is indicated by at least the first precoding index number, and a value of the $\phi$ is indicated by at least the second precoding index number.

10. The communication method as set forth in claim 9, wherein the plurality of transmission layers are two transmission layers.

11. A wireless communications system comprising:

a base station device including a first multi antenna and a second multi antenna; and a user device configured to and/or programmed to communicate with the base station device, using a plurality of transmission layers, wherein the user device is configured to and/or programmed to feed back a first precoding index number and a second precoding index number to the base station device, the base station device is configured to and/or programmed to transmit, to the user device, a transmission signal multiplied by a first precoding matrix, the first precoding matrix is based on at least (i) a second precoding matrix applied identically to both a transmission signal of the first multi antenna and a transmission signal of the second multi antenna, and (ii) a weight coefficient value applied identically to each of the plurality of transmission layers of the transmission signal of the second multi antenna, wherein the weight coefficient value is a phase adjusting amount of the transmission signal of the second multi antenna, which equals to $\exp(-j\phi)$, the second precoding matrix is indicated by at least the first precoding index number, and a value of the $\phi$ is indicated by at least the second precoding index number.

12. The wireless communication system as set forth in claim 11, wherein:

a total number of antennas used to transmit the transmission signal is 4 or 8;

a number of antennas of the first multi antenna and a number of antennas of the second multi antenna are same with each other; and the plurality of transmission layers are two layers.

13. The wireless communications system as set forth in claim 11, wherein the plurality of transmission layers are two transmission layers.

* * * * *